US006990249B2

(12) United States Patent
Nomura

(10) Patent No.: US 6,990,249 B2
(45) Date of Patent: Jan. 24, 2006

(54) IMAGE PROCESSING METHODS AND IMAGE PROCESSING APPARATUS

(75) Inventor: Shoichi Nomura, Hachioji (JP)

(73) Assignee: Konica Corporation, Tokyo (JP)

( * ) Notice: Subject to any disclaimer, the term of this patent is extended or adjusted under 35 U.S.C. 154(b) by 636 days.

(21) Appl. No.: 10/080,630

(22) Filed: Feb. 21, 2002

(65) Prior Publication Data

US 2002/0118019 A1    Aug. 29, 2002

(30) Foreign Application Priority Data

Feb. 27, 2001    (JP)    ............................ 2001-051681

(51) Int. Cl.
*G06K 9/40*    (2006.01)
(52) U.S. Cl. ...................... 382/254; 382/260; 382/298; 382/300; 348/580; 358/451
(58) Field of Classification Search ................ 382/254, 382/260–264, 270–275, 296, 298–300; 345/611; 348/580–583, 606–607; 358/451, 463, 525
See application file for complete search history.

(56) References Cited

U.S. PATENT DOCUMENTS

| | | | | |
|---|---|---|---|---|
| 5,196,935 A | * | 3/1993 | Cremonesi et al. | ......... 348/624 |
| 5,268,751 A | * | 12/1993 | Geiger et al. | ............... 348/446 |
| 5,361,105 A | * | 11/1994 | Iu | .............................. 348/699 |
| 5,523,802 A | * | 6/1996 | Sugihara et al. | ............ 348/743 |
| 5,526,119 A | * | 6/1996 | Blit et al. | ................... 356/402 |
| 5,561,724 A | * | 10/1996 | Kido et al. | ................. 382/264 |
| 5,585,859 A | * | 12/1996 | Ward et al. | ................. 348/619 |
| 5,628,321 A | * | 5/1997 | Scheib et al. | ............... 600/453 |
| 5,774,601 A | * | 6/1998 | Mahmoodi | .................. 382/298 |
| 5,838,833 A | * | 11/1998 | Ishikawa et al. | ............ 382/249 |
| 6,594,400 B1 | * | 7/2003 | Kim | ........................... 382/268 |
| 6,611,618 B1 | * | 8/2003 | Peli | ............................. 382/154 |
| 6,614,944 B1 | * | 9/2003 | Levantovsky | ............... 382/261 |
| 6,631,216 B2 | * | 10/2003 | Hieda et al. | ................. 382/300 |
| 6,765,587 B1 | * | 7/2004 | Zhang et al. | ............... 345/606 |
| 6,792,128 B1 | * | 9/2004 | Nguyen | ...................... 382/100 |
| 6,816,193 B1 | * | 11/2004 | Kohashi et al. | ............. 348/234 |

FOREIGN PATENT DOCUMENTS

JP    63178674 A    *    7/1988
JP    63285669 A    *    11/1988

* cited by examiner

*Primary Examiner*—Bhavesh M. Mehta
*Assistant Examiner*—Yubin Hung
(74) *Attorney, Agent, or Firm*—Frishauf, Holtz, Goodman & Chick, P.C.

(57) ABSTRACT

There is described image-processing methods and image processing apparatus, which enable sharpness, scaling coefficients, and image quality to be adjusted with minimum image noise and minimum image quality deterioration and at high processing speed. One of the image-processing methods for creating processed image data by applying a spatial-filtering processing to source image data, comprises the steps of: setting a predetermined upper-limit value for a variation amount of the source image data, before performing an image-conversion processing through which the source image data are converted to the processed image data by applying the spatial-filtering processing; and performing the image-conversion processing for the source image data within a range of the variation amount limited by the predetermined upper-limit value. In the above, a plurality of spatial-filtering processing(s), characteristics of which are different each other, are performed either simultaneously in parallel or sequentially one by one in the image-conversion processing.

12 Claims, 19 Drawing Sheets

Measure of scaling coefficients

| MEASURE OF SCALING COEFFICIENTS | ENLARGING | REDUCTION |
|---|---|---|
| PRIMARY ENLARGING RATIO | 1.3~1.8 | 0.6~0.7 |
| SCALING COEFFICIENT CHANGED TO TWO-STEP PROCESSING | 1.9 TO 2.0 OR MORE | 0.6 TO 0.5 OR LESS |

FIG. 18 (a)   FIG. 18 (b)
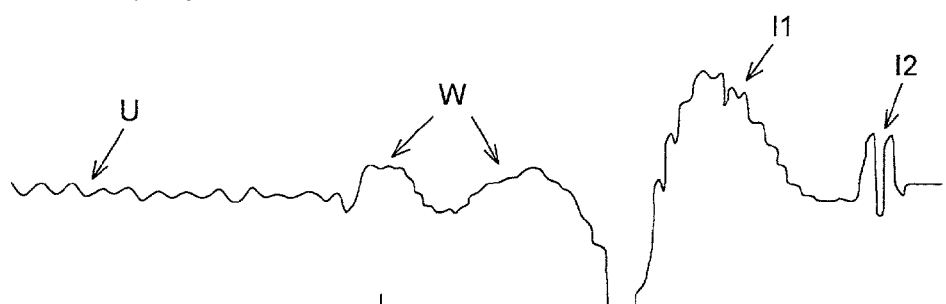
FIG. 19 (a)
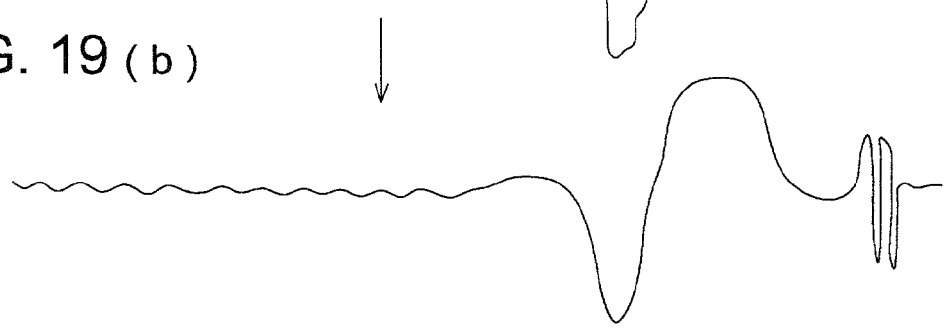
FIG. 19 (b)

FIVE PIXELS SKIPPED (PIXELS USED FOR CALCULATION)

FIVE PIXELS SKIPPED

PERIPHERAL PIXELS USED FOR CALCULATION

| | | | | |
|---|---|---|---|---|
| -1 | -1 | -1 | | |
| -2 | -2 | -2 | -1 | |
| -3 | -3 | -2 | -2 | -1 |
| -5 | -5 | -3 | -2 | -1 |
| 148 | -5 | -3 | -2 | -1 |

FIVE-PIXEL SPACE

/ Const

| | | | | |
|---|---|---|---|---|
| | | -5 | | |
| -8 | | | | |
| | | | -8 | -5 |
| | -11 | | | |
| 148 | | | -8 | |

FIVE-PIXEL SPACE

/ Const

◎ CENTRAL (NOTICED) PIXEL

○ PERIPHERAL PIXELS

IMAGE PROCESSING METHODS AND IMAGE PROCESSING APPARATUS

BACKGROUND OF THE INVENTION

The present invention relates to image processing methods and image processing apparatus.

Image processing apparatus that acquires image information from an image input unit such as a digital still camera, flat-bet (FB) scanner, or film scanner, then provides the image information with various types of image processing, and prints images onto an image output unit such as an ink jet printer, thermal sublimating printer, or silver salt digital printer for obtaining images by providing silver salt photographic printing paper with a scanning exposure process and a developing process by use of an array-type exposure head or a laser, and equipment by which the images that have been acquired from the above-mentioned image input units are further stored as image information onto image recording media such as a CDR, have come into most common use in recent years.

These pieces of equipment are applied not only to reproduce read images by printing them as they are, but also to combined use of various types of digital image processing such as providing spatial filter processing for the adjustment of sharpness, providing color conversion to obtain clearer photographs, and/or providing specific color tone conversion for the purpose of, for example, correcting the contrast of the photographs which have suffered defects in contrast reproducibility due to under-exposure (mistakes in photographing).

In general, however, image information that has been acquired from image input units contains noise, whether it be varying in degree. Such noise has the characteristic that when spatial filtering is provided in an attempt to improve sharpness or color conversion is provided in an attempt to obtain clearer photographs, the noise level will be augmented and conspicuous.

Incidentally, as will be detailed later, the spatial-filtering processing (hereinafter, also referred to as a spatial filtering) includes various kinds of operations, such as an operation for finding sum-of-product values between noticed pixels and peripheral pixels, an operation for obtaining information in regard to the spatial frequency and the amplitude by employing Fourier transformation processing to adjust the amplitude at every spatial frequency, etc. The object of such the spatial-filtering processing is to change sharpness, resolution, granularity and spatial-frequency response characteristics of the source image.

If, during photographing with a color negative film, the scene is underexposed for whatever reason and provided with a great deal of color tone conversion (the improvement of shadows in contrast) in an attempt to correct this underexposed scene that has decreased in the contrast of shadows due to the under-exposure, the noise components will also be enlarged as they are, and then if the film is spatially filtered to improve sharpness, the noise itself will also be increased. In addition, for the type of printing system that obtains images by providing a silver salt photosensitive material with digital exposure or sublimating and/or transferring a thermal sublimating color material, the images finished will usually be slightly blurred, which will result in deteriorated contrast.

If correcting these blurred portions of the images is attempted, the noise level will be further increased. Image blurs usually occur in relatively large areas, and if improving this state is attempted, the calculation time required for the improvement will also increase to an unacceptable level.

Also, in order to obtain a photograph of the desired size, image information is usually enlarged or reduced in size according to the particular image resolving power of the image processing apparatus. Such an enlarging/reducing process mostly uses a linear interpolation method in terms of factors such as processing speed and the preferability of image processing. In such a case, there is the problem that if the noise contained in the image increases above a certain level or if sharpness enhancement is strengthened to obtain sufficient sharpness, when the image undergoes processing at a magnification close to its original scaling coefficient (for example, when the image is enlarged at a scaling coefficient of 1.05 using a 300-dpi output unit), the noise level of the image will change cyclically (in the above example, at cycles of $1/15$ of an inch) and the noise will appear as a moire-like fringe pattern.

Therefore, various techniques for reducing or removing the noise components of images are being studied in order to solve the above-described problems associated with image quality. However, the use of a noise reduction filter by which a sufficient reduction or removal effect can be obtained usually presents other problems such as the deterioration in the details of the image. Also, since noise filtering, as with spatial filtering, requires a long processing time, serious problems arise in terms of equipment costs, operational convenience, and operating capabilities.

SUMMARY OF THE INVENTION

To overcome the above-mentioned drawbacks in conventional image-recording apparatus, it is an object of the present invention to provide image-processing methods and image processing apparatus that enable sharpness, scaling coefficients, and image quality to be adjusted with minimum image noise and minimum image quality deterioration and at high processing speed.

Accordingly, to overcome the cited shortcomings, the above-mentioned object of the present invention can be attained by image processing methods and image-processing apparatus described as follow.

(1) An image-processing method for creating processed image data by applying a spatial-filtering processing to source image data, comprising the steps of: setting a predetermined upper-limit value for a variation amount of the source image data, before performing an image-conversion processing through which the source image data are converted to the processed image data by applying the spatial-filtering processing; and performing the image-conversion processing for the source image data within a range of the variation amount limited by the predetermined upper-limit value.

(2) The image-processing method of item 1, wherein a plurality of spatial-filtering processing(s), characteristics of which are different each other, are performed either simultaneously in parallel or sequentially one by one in the image-conversion processing, and the predetermined upper-limit value is set for every spatial-filtering processing, corresponding to each of the characteristics of them.

(3) The image-processing method of item 2, wherein a first spatial filter, having a characteristic to emphasize an amplitude of image data residing in a first spatial frequency band and also having a first upper-limit value set as the predetermined upper-limit value, and a second spatial filter, having a characteristic to de-emphasize an amplitude of image data residing in a second spatial frequency band and also having a second upper-limit value set as the predetermined upper-limit value, are provided in the plurality of spatial-filtering processing(s), and wherein the first spatial frequency band is higher than the second spatial frequency band, and the first upper-limit value is greater than the second upper-limit value.

(4) The image-processing method of item 2, wherein a plurality of spatial filters are provided in the plurality of spatial-filtering processing(s), each of them corresponding to each of the plurality of spatial-filtering processing(s), and wherein, only when an absolute value of the variation amount, derived by applying the spatial-filtering processing to each pixel data value corresponding to each of the plurality of spatial filters, is higher than a predetermined lower-limit value, the spatial-filtering processing is applied to the pixel data.

(5) An image-processing method for creating a variable sized image by applying either an enlargement or a reduction processing to source image data including a plurality of color components, comprising the step of: applying a plurality of spatial-interpolation processing methods, being different relative to each other, to the source image data, while each of the plurality of spatial-interpolation processing methods is corresponding to each of the plurality of color components.

(6) The image-processing method of item 5, wherein one of the spatial-interpolation processing methods, being different in response to a magnification factor of either the enlargement or the reduction processing, is employed for processing at least one of the color components.

(7) The image-processing method of item 6, wherein the spatial-interpolation processing methods are performed by employing weighted average values of a plurality of pixels, and look-up tables (LUTs) of weighting coefficients, corresponding to the plurality of spatial-interpolation processing methods, are provided, and wherein a weighted averaging operation in respect to the look-up tables is further performed in response to the magnification factor of either the enlargement or the reduction processing, in order to create new look-up tables for spatial-interpolation processing(s).

(8) The image-processing method of item 6, wherein one of the color components includes data sets of at least three dimensions, one of which represents brightness information, and another two of which represent chrominance coded information, and with respect to a dimension representing the brightness information, a spatial-interpolation processing method, being different from that employed for the chrominance coded information, is applied, and the spatial-interpolation processing method is further changed in response to the magnification factor.

(9) An image-processing method for creating processed image data by applying a spatial-filtering processing and either an enlargement or a reduction processing to source image data, under a condition that a magnification factor of either the enlargement or the reduction processing is lower than a predetermined value, comprising the steps of: performing a size-varying processing to vary a size of an image up to a predetermined intermediate size established in advance and an angle-rotating processing to rotate an angle of the image up to a first angle value, being a predetermined rotating angle, applying the spatial-filtering processing to image data processed by the size-varying processing and the angle-rotating processing; and performing again the size-varying processing to further vary the size of the image up to an objective size also established in advance and the angle-rotating processing to reversely rotate the angle of the image up to a second angle value, being opposite the first angle value.

(10) An image-processing method, comprising the steps of: extracting a plurality of couples of pixels, in each of which two pixels are symmetrically positioned in respect to an objective pixel to be processed through an image-processing; calculating differential values between the two pixels and the objective pixel with respect to the plurality of couples of pixels; extracting a specific couple of pixels, having a minimum differential value, out of the plurality of couples of pixels; and setting a weighted-addition average value of three pixels including the specific couple of pixels and the objective pixel concerned, as a new objective pixel.

(11) The image-processing method of item 10, wherein, only when the minimum differential value is lower than a first threshold value established in advance, a weighted-addition averaging processing is performed with respect to the specific couple of pixels.

(12) The image-processing method of item 11, further comprising the steps of: establishing a new threshold value, which is obtained by adding a predetermined positive value to the minimum differential value; extracting all of specific couples of pixels, differential values of which are lower than the new threshold value, out of the plurality of couples of pixels; and setting an average value of image data, included in the specific couples of pixels, as a value of a noticed pixel.

(13) The image-processing method of item 11, further comprising the steps of: establishing a second threshold value, being lower than the first threshold value established in advance; and applying a noise-filtering processing to smoothen all image signals, being lower than the second threshold value.

(14) An image-processing method for processing source image data, comprising the steps of: setting a first threshold value predetermined in advance and a maximum radius from a noticed pixel, to be processed by an image-processing, to an objective pixel, being an object for comparison, with respect to the source image data; applying a signal-smoothening processing to the source image data on the basis of the first threshold value and a differential value between the noticed pixel and the objective pixel to generate second source image data; setting a second threshold value, which is smaller than the first threshold value, and a radius, which is larger than the maximum radius; and applying again the signal-smoothening processing to the second source image data.

(15) The image-processing method of item 14, wherein the source image data are obtained by applying a gradation-converting processing to image data outputted by an image inputting apparatus, and the first threshold value and/or the second threshold value are/is found on the basis of gradation-conversion characteristics in the vicinity of a signal value of the noticed pixel to be processed by the image-processing.

(16) An image-processing method for processing source image data including a plurality of color components, each of which includes data sets of at least three dimensions, one of which represents brightness information, and another two of which represent chrominance coded information, comprising the steps of: applying a first spatial-filtering processing to a data set representing the brightness information; and applying a second spatial-filtering processing to all of the data sets; wherein a power for emphasizing a low-spatial frequency region in the second spatial-filtering processing is greater than that in the first spatial-filtering processing.

(17) The image-processing method of item 16, further comprising the step of: performing a color coordinate-converting processing by which the brightness information and the chrominance coded information are converted to each of color component signals, after applying the first spatial-filtering processing and before applying the second spatial-filtering processing.

(18) An image-processing apparatus for processing an image, comprising: an image-inputting section to acquire image data of a source image from an image recording medium or a document having the source image; an image-processing section to apply an image-processing to the image data acquired by the image inputting section, so as to create processed image data; and an image-outputting section to output the image in either a first mode that the processed image data are written onto an information-recording medium, or a second mode that the image is written on an image recording medium to obtain a hardcopy, or a third mode that the image is displayed on an image-displaying device; wherein the image-processing section employs anyone of the image-processing methods described in items 1–17.

(19) An image-processing method for creating processed image data by applying a spatial-filtering processing and a size-converting processing in an enlarging direction to source image data, comprising the steps of: determining whether an effect of a sharpness-emphasizing processing, to be performed in the spatial-filtering processing, should be relatively strong or weak, based on instructive information in regard to image-processing items inputted in advance; and applying the spatial-filtering processing at first, and then, the size-converting processing to the source image data, when determining that the effect of the sharpness-emphasizing processing should be relatively strong; or applying the size-converting processing at first, and then, the spatial-filtering processing to the source image data, when determining that the effect of the sharpness-emphasizing processing should be relatively weak.

(20) An image-processing apparatus for processing an image, comprising: an image-inputting section to acquire image data of a source image from an image recording medium or a document having the source image; an instructive-information inputting section to input instructive information in regard to image-processing items to be performed in the image-processing apparatus; an image-processing section to apply an image-processing to the image data acquired by the image inputting section, so as to create processed image data; and an image-outputting section to output the image in either a first mode that the processed image data are written onto an information-recording medium, or a second mode that the image is written on an image recording medium to obtain a hardcopy, or a third mode that the image is displayed on an image-displaying device; wherein the image-processing section determines whether an effect of a sharpness-emphasizing processing, to be performed in a spatial-filtering processing, should be relatively strong or weak, based on the instructive information in regard to the image-processing items inputted by the instructive-information inputting section; and wherein the image-processing section applies the spatial-filtering processing at first, and then, the size-converting processing to the image data, when determining that the effect of the sharpness-emphasizing processing should be relatively strong; or the image-processing section applies the size-converting processing at first, and then, the spatial-filtering processing to the image data, when determining that the effect of the sharpness-emphasizing processing should be relatively weak.

(21) An image-processing method for extracting specific pixel values, whose differential values are lower than a predetermined threshold value, in respect to noticed pixels, and applying a weighted-addition averaging processing to the specific pixel values, comprising the steps of: further extracting a maximum pixel value and a minimum pixel value out of the specific pixel values; and applying an averaging processing to residual pixel values obtained by excluding the maximum pixel value and the minimum pixel value from the specific pixel values.

(22) An image-processing method for finding sum-of-product values between noticed pixels and peripheral pixels, and establishing the sum-of-product values as values of the noticed pixels, comprising the step of: extracting the peripheral pixels, to be employed for a calculation, out of a plurality of discontinuous pixels, wherein distance intervals for extracting the peripheral pixels are unequal relative to each other.

(23) The image-processing method of item 16, wherein the second spatial-filtering processing further comprises the steps of: finding sum-of-product values between noticed pixels and peripheral pixels; establishing the sum-of-product values as values of the noticed pixels; and extracting the peripheral pixels, to be employed for a calculation, out of a plurality of discontinuous pixels, wherein distance intervals for extracting the peripheral pixels are unequal relative to each other.

Further, to overcome the above-mentioned problems, other image-processing methods and image-processing apparatus, embodied in the present invention, will be described as follow:

(24) An image processing method for creating processed image data by providing the source image data with spatial filtering, wherein said image processing method is characterized in that a predetermined upper-limit value for a variation amount of the source image data (hereinafter, referred to as the maximum allowable data variation) is specified for the data variations existing before and after spatial filtering of pixel data, and in that image processing not exceeding said maximum allowable data variation is provided after it has been specified.

It is possible by adopting the above-described configuration to suppress effectively the strong noise appearing as white spots or black spots on images when sharpness is enhanced.

(25) An image processing method characterized in that during image processing described above, a plurality of spatial filtering processes different in characteristics are performed either simultaneously in parallel or in sequence, and in that the maximum allowable data variation corresponding to each spatial filtering process different in characteristics is provided.

It is possible by adopting the above-described configuration to obtain the noise suppression effect corresponding to the characteristics of the filter and to the necessary image effect.

(26) An image processing method characterized in that the plurality of spatial filters mentioned above consist of a first spatial filter having the characteristic that it enhances the amplitude of a certain spatial frequency region, in that a second spatial filter having the characteristic that it attenuates the amplitude of the region of spatial frequencies lower than those of said first spatial filter, and in that the maximum allowable data variation that has been set for the first spatial filter is greater than the maximum allowable data variation that has been set for the second spatial filter.

It is possible by adopting the above-described configuration to provide sharpness enhancement during which noise is suppressed, and at the same time to suppress effectively the characteristic low-frequency noise of silver salt films and the chroma noise occurring with digital images.

(27) An image processing method characterized in that if any absolute data variations based on spatial filtering of the pixel data corresponding to each spatial filter are smaller than the minimum allowable data, spatial filtering will not be executed for the noticed pixels.

In addition to the provision of the characteristics described above, preferable reproduction of gradation images is further possible by adopting the above-described configuration.

(28) An image processing method for creating images of various sizes by enlarging/reducing the source image data having a plurality of color components, wherein said image processing method is characterized in that a different spatial interpolation method is used for each color component.

It is possible by adopting the above-described configuration to minimize moire-like noise and other defects since the appropriate interpolation process is performed for each color component.

(29) An image processing method characterized in that the spatial interpolation method used for at least one of the color components mentioned above will differ according to the new magnification factor (hereinafter, also referred to as the scaling coefficient) specified for the enlarging/reducing process.

It is possible by adopting the above-described configuration to achieve preferable image processing with higher accuracy since an more precisely interpolation process can be performed on each color component that requires accuracy.

(30) An image processing method characterized in that said spatial interpolation is based on the weighted average of a plurality of pixels, in that look-up tables (LUTs) of the weighting coefficients corresponding to individual spatial interpolation processes are provided, and in that each LUT is provided with weighted averaging according to the new scaling coefficient specified for the enlarging/reducing process and thus a new LUT for spatial interpolation is created.

It is possible by adopting the above-described configuration to obtain stable processing characteristics for various scaling coefficients since, even when the scaling coefficient is adjusted precisely, spatial interpolation characteristics can also be set precisely.

(31) An image processing method characterized in that said color components consist of at least three or four dimensions of information, including one dimension that denotes brightness information and at least two dimensions that denote chrominance coded information, in that a spatial interpolation method different from that of the chrominance coded information is used for the dimension that denotes brightness information, and in that the spatial interpolation method is changed according to the specified new scaling coefficient.

It is possible by adopting the above-described configuration to implement both high-accuracy processing and high-speed processing by performing a highly accurate interpolation process on the brightness information and applying fast processing to the color components.

(32) An image processing method for creating processed image data by providing source image data with spatial filtering and size enlarge/reduce processing, wherein said image processing method is characterized in that if the specified new scaling coefficient for the enlarging/reducing process is greater than the required value, this value will be changed to a predetermined pre-processing size first and then when spatial filtering is provided, the remaining enlarge/reduce process will be performed.

It is possible by adopting the above-described configuration to reduce the disadvantages that when strong enlarge/reduce processing is provided, size reduction information will be missing, and that when the image is enlarged, the original shape of pixels will be visible or the image itself will lack smoothness.

(33) An image processing method characterized in that a plurality of sets of two pixels present at mutually symmetrical points with respect to the pixels to undergo image processing are extracted and after the differential information between the two points and the noticed pixels has been calculated and the two points at which the differential information becomes a minimum have been further extracted from the plurality of sets, the weighted-addition average value of three points (the latter two points and the target pixel point) is taken as a new target pixel value.

It is possible by adopting the above-described configuration to reduce strong image noise with the edge of image information being left intact.

(34) An image processing method characterized in that the two points at which said differential information becomes a minimum will undergo weighted averaging only when the differential information value is smaller than predetermined threshold value A.

It is possible by adopting the above-described configuration to realize the noise filtering processes that enable edge information to be maintained more easily, since differential information values greater than the threshold value will not undergo smoothing.

(35) An image processing method characterized in that the value obtained by adding the required positive number to said minimum differential information value is taken as a new threshold value, and after, among all said differential information, only the sets of information that are smaller than said new threshold value have been extracted, the average value of the pixel data contained in the extracted sets is taken as the value of the noticed pixels.

It is possible by adopting the above-described configuration to conduct filtering that yields a greater reduction effect against noise.

(36) An image processing method characterized in that after the source image has undergone image processing described in Items (33) to (35) above, required threshold value B smaller than said threshold value A is set and noise filtering is provided to smoothen all image signals whose levels are lower than threshold value B.

It is possible by adopting the above-described configuration to achieve a wide range of noise elimination with smaller threshold value B since strong noise components are suppressed beforehand by image processing described in Items (33) to (35) above, and hereby to reduce noise effectively without damaging the details of the image.

(37) An image processing method characterized in that required threshold value A and the maximum radius R from the noticed pixels to undergo image processing to the pixels to be compared are calculated with respect to the source image, and after image signal smoothening based on the differential information between the noticed pixels and the pixels to be compared, and on said threshold value A, has been provided, threshold value B smaller than said threshold value A, and radius S greater than said radius R are determined and said smoothening is repeated once again.

It is possible by adopting the above-described configuration to achieve smooth and high-quality image processing because strong noise can be reduced and because weak image noise can be eliminated over a wide range and strongly.

(38) An image processing method characterized in that said source image is obtained by gradation conversion of the image input signal value that has been obtained from an image input unit, and in that both of said threshold values A and B or either one of them is derived from the gradation conversion characteristics corresponding to signal values close to those of the noticed pixels to undergo image processing.

It is possible by adopting the above-described configuration to obtain high image reproducibility over a wide range from highlighted portions to shadow portions since the noise processing level can be changed according to the amount of noise encountered during gradation conversion.

(39) An image processing method characterized in that said color components consist of at least three or four dimensions of information, including one dimension that denotes brightness information and at least two dimensions that denote chrominance coded information, in that the component that denotes brightness information is provided with a first spatial filtering process, and in that after this, all information is provided with a second spatial filtering process that enhances an area lower than the first spatial filtering process in terms of spatial frequency.

It is possible by adopting the above-described configuration to obtain accuracy easily and achieve high-speed processing, since high-frequency information that requires accuracy can undergo processing in one dimension only.

(40) An image processing method characterized in that after said first spatial filtering process has been performed, color coordinates are converted from brightness information and chrominance coded information into various color component information and then a second spatial filtering process is performed.

It is possible by adopting the above-described configuration to effectively adjust changes in the characteristics of each color component in, for example, an image reading unit or image writing unit, since low-frequency processing can be conducted for each color component.

(41) An image processing apparatus equipped with an image input means for acquiring the image information that has been either obtained from image-containing original paper by use of split photometry or recorded on image recording media, an image processing means for creating processed image information by providing image processing of the input image information that has been obtained from said image input means, and an image output means for obtaining hardcopies by storing processed image information onto information recording media or recording media or for displaying images on image display media, wherein said image processing apparatus is characterized in that said image processing means implements image processing described in either item from 24 to 39.

It is possible by adopting the above-described configuration to realize a high-quality high-speed image output service.

(42) An image processing method for creating processed image data by providing source image data with spatial filtering and size enlarge processing, wherein said image processing method is characterized in that when sharpness enhancement resistant to spatial filtering is specified by pre-entered instruction information on the type of image processing, spatial filtering, followed by size enlarge processing, will be provided as image processing, or when sharpness enhancement not resistant to spatial filtering is specified by said instruction information, size enlarge processing, followed by spatial filtering, will be provided as image processing.

It is possible by adopting the above-described configuration to execute sufficient enhancement easily when high sharpness is required, and accomplish smooth gradation reproduction with less noise when relatively low sharpness is required.

(43) An image processing apparatus equipped with an image input means for acquiring the image information that has been either obtained from image-containing original paper by use of split photometry or recorded on image recording media, an instruction input means for entering the intended type of image processing, an image processing means for creating processed image information by providing image processing of the input image information that has been obtained from said image input means, and an image output means for obtaining hardcopies by storing processed image information onto information recording media or recording media or for displaying images on image display media, wherein said image processing apparatus is characterized in that depending on the image processing type instruction information that has been entered using said instruction input means beforehand, spatial filtering, followed by size enlarge processing, will be provided as image processing when sharpness enhancement resistant to spatial filtering is specified by the pre-entered image processing type instruction information, or size enlarge processing, followed by spatial filtering, will be provided as image processing when sharpness enhancement not resistant to spatial filtering is specified by said instruction information.

It is possible by adopting the above-described configuration to achieve high-quality image processing that matches the particular requirements.

BRIEF DESCRIPTION OF THE DRAWINGS

Other objects and advantages of the present invention will become apparent upon reading the following detailed description and upon reference to the drawings in which:

FIG. 18(a) and FIG. 18(b) are explanatory diagrams of the operation of a spatial filter;

FIG. 19(a) and FIG. 19(b) are diagrams showing the noise characteristics of a film.

FIG. 23(a) and FIG. 23(b) are diagrams showing an example of blur correction filtering coefficients;

DETAILED DESCRIPTION OF THE PREFERRED EMBODIMENTS

The preferred embodiments of the present invention are described in detail below using drawings. The invention is not limited by these embodiments.

Figure 1:
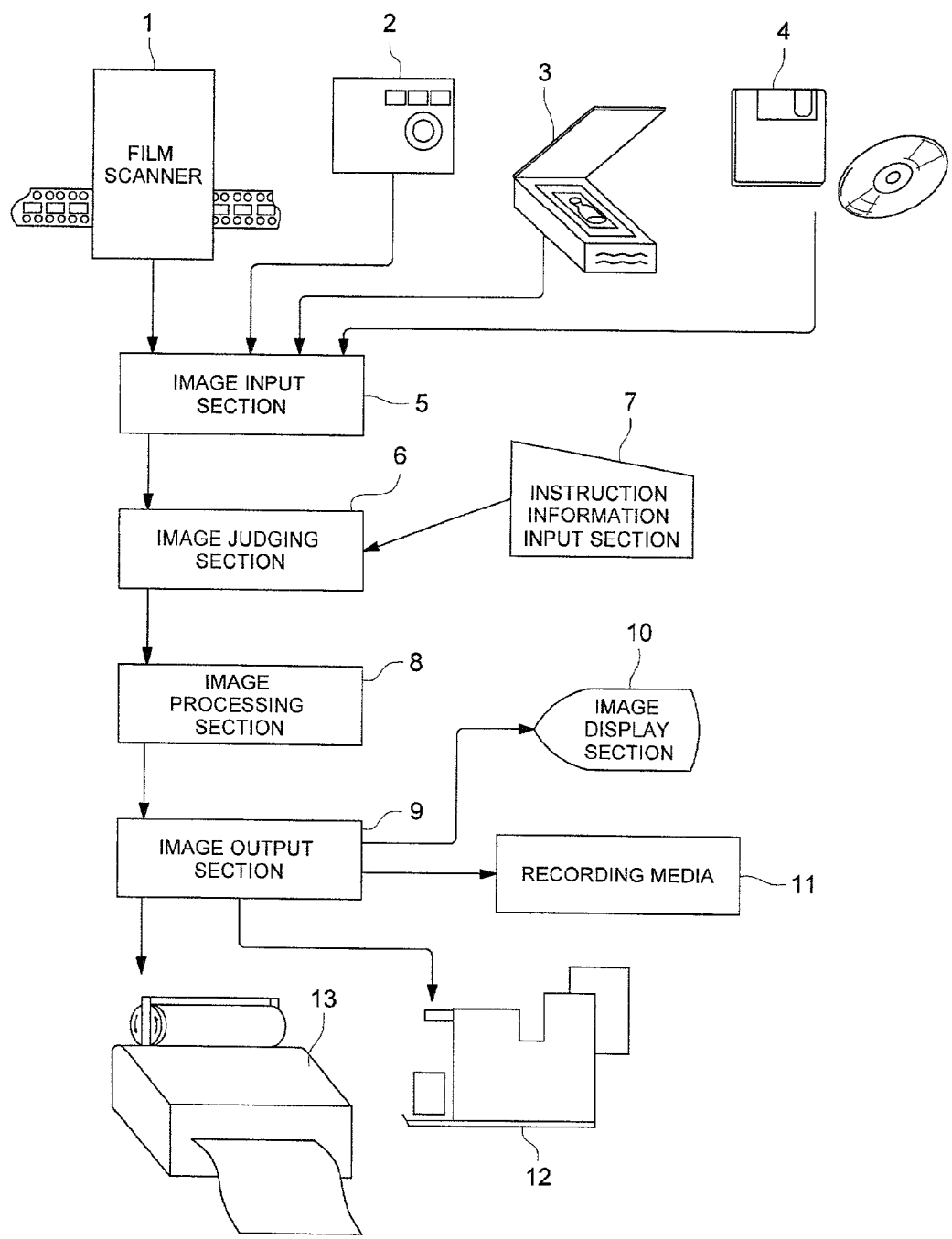
FIG. 1 is a block diagram showing an embodiment of the image processing apparatus pertaining to the present invention.

FIG. 1 is a block diagram showing an embodiment of the image processing apparatus pertaining to the present invention. In the figure, numeral 1 denotes a film scanner for reading digital image information from films. Similarly, numeral 2 denotes a digital still camera (DSC) for storing photographed images as digital image information, numeral 3 denotes a flat-bed (FB) scanner for reading digital image information from photographs and the like, and numeral 4 denotes an information storage medium for storing image information. Said information storage medium 4 is, for example, a floppy disk (FD) or a compact disk (CD).

Numeral 5 denotes an image input section for entering the digital image information sent from film scanner 1, DSC2, FB scanner 3, or information storage medium 4. Film scanner 1, DSC2, FB scanner 3, or information storage medium 4, and image input section 5 constitute the image input means. Numeral 6 denotes an image judging section for performing image judgments based on the output of image input section 5, and numeral 7 denotes an instruction information input section for entering instruction information into image judging section 6 mentioned above.

Image judging section 6 judges how the color is to be processed and at what density the image is to be printed, and determines the color correction values for Y, M, and C. Instruction information input section 7 gives various instruction information for manual image adjustment, to image judging section 6. Image judging section 6 executes foregoing processing, under the directions of instruction information input section 7.

Numeral 8 denotes an image processing section for providing the output of image judging section 6 with the various types of image processing described later in this document. A CPU, for example, is used as the image processing section 8. Numeral 9 denotes an image output section for receiving the image data that has been processed by image processing section 8 and sending the corresponding image. Numeral 10 denotes an image display section for receiving the output of image output section 9 and displaying the corresponding image. Image display section 10 mentioned above is, for example, a CRT, an LCD, or the like.

Numeral 11 denotes a recording medium onto which the output of image output section 9 is to be stored, and is, for example, a floppy disk (FD), a magneto-optic (MO) disk, a direct read after write optical disk (CDR), or the like. Numeral 12 notes a silver salt digital printer for receiving the output of image output section 9 and printing the corresponding photograph, and numeral 13 denotes an ink jet (IJ) printer for receiving the output of image output section 9 and printing the corresponding image. The operation of the system which has thus been configured is outlined below.

Digital image data from film scanner 1, DSC2, FB scanner 3, or information storage medium 4, enters image input section 5 and is stored into a memory or the like. The image judging section 6, after receiving image data from image input section 5, performs image judgments in accordance with the instructions of instruction information input section 7. Image processing section 8 receives image data from image judging section 6 and performs processes such as filtering, scaling coefficient changing, spatial filtering, and image blur correction.

Image data that has thus undergone image processing is given to image output section 9, from which the corresponding image is then sent to image display section 10. That is to say, the image is displayed by image display section 10 or recorded on recording medium 11, then after being printed by silver salt printer 12, further printed by IJ printer.

Figure 2:
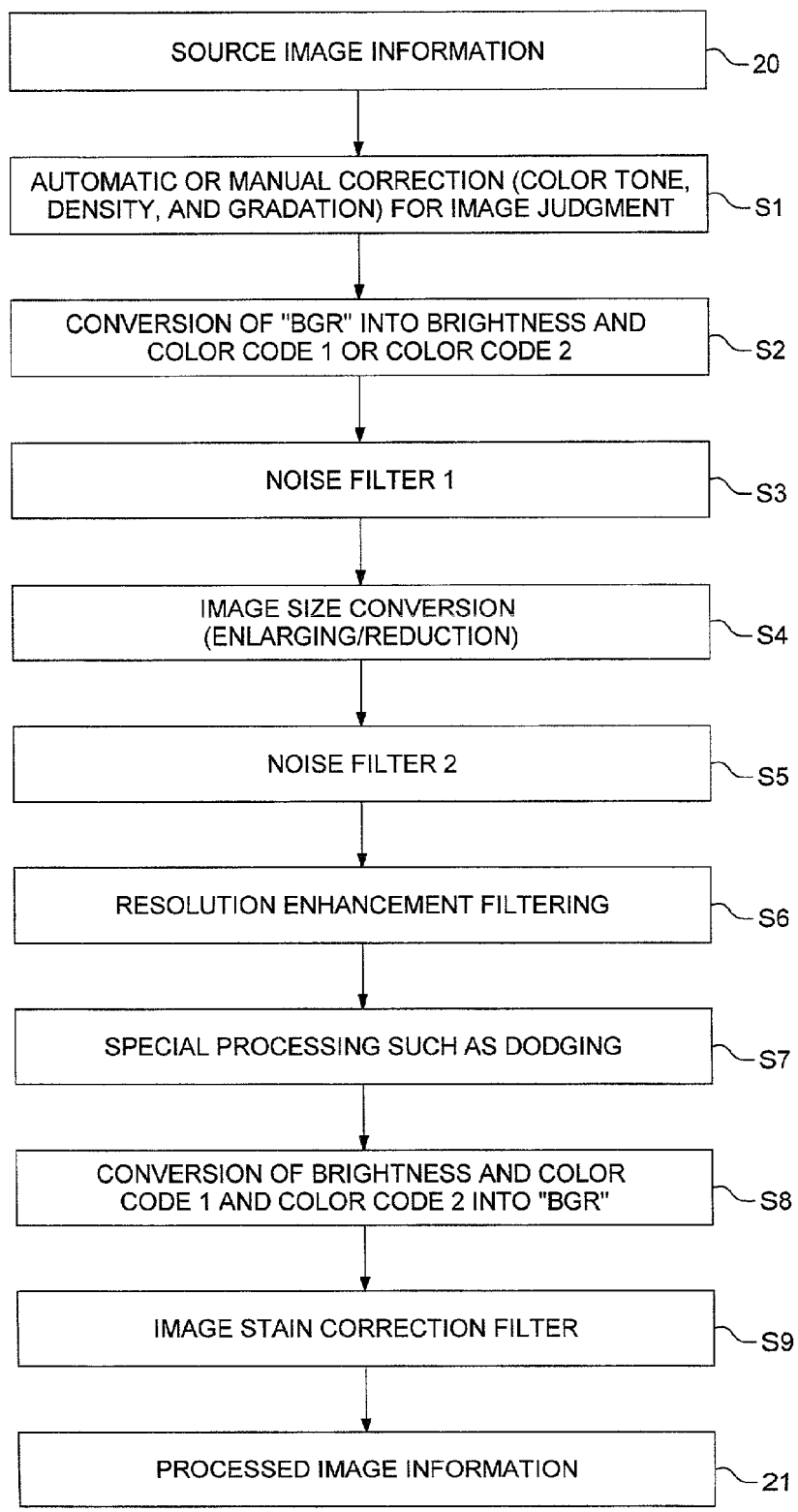
FIG. 2 is a flowchart showing the entire image processing method.

FIG. 2 is a flowchart showing the entire image processing method. First, source image data 20 undergoes image judgment based on automatic or manual color tone, density, and gradation correction (S1). Next, image judgment of the image data ("bgr") is followed by brightness/chromatic level 1/chromatic level 2 conversion (S2).

Brightness, chromatic level (color code) 1, and chromatic level (color code) 2 are represented by, for example, the following expressions:

$$\text{Brightness} = (b+g+r)/3 \quad (1)$$

$$\text{Color code } 1 = r-b \quad (2)$$

$$\text{Color code } 2 = [(r+b)/2]-g \quad (3)$$

where "b", "g", and "r" denote the pixel values of blue, green, and red pixels, respectively. In addition to the above examples, there are various other types of color code information, and chromatic coordinates, for example, "L*a*b*" or "L*u*v*" or "Yxy" in the CIE system can be used instead.

In the present invention, brightness data is used to implement first noise filtering (S3). Next, an image size conversion process is performed on noise-filtered image data. This image size conversion process (scaling coefficient changing process) is performed to obtain the image size that suits the purpose of use of the processed image, and the size of the corresponding image is enlarged or reduced in this step. In this step, image trimming and/or rotation can also be implemented as required. If these processes are unnecessary, the image size conversion process can be skipped. Next, image data on which the image size conversion process has been performed undergoes second noise filtering (S5). This noise filtering process is performed only for the brightness data of the image data.

Next, the noise-filtered image undergoes sharpness enhancement filtering (S6). This sharpness enhancement filtering process is also performed only for the brightness data of the image data. In this way, several types of image processing, such as the noise filtering processes and sharpness enhancement filtering process, are executed primarily for brightness data because human eyes have the characteristics that they are low in spatial resolving power with respect to color differences and that they cannot easily identify noise superimposed on colors.

In the next step (S7), special processing (such as dodging occurs) as required. Dodging refers to a method in which, for a photograph showing a character(s) in a dark color, background (sky, for example,) in a very bright color, and plants in a very dark color, such as for a commemorative photograph that was taken against light, when the respective constituent elements cannot be reproduced at preferable brightness on a normal print, each target is reproduced at the appropriate brightness level by conducting corrections on the background image until it has become dark, conducting no corrections on the character(s), and conducting corrections on the plants until it has become bright.

Next, inverse conversion into "bgr", based on brightness data and color code 1 and color code 2 data, is conducted (S8). Each of the "b", "g", and "r" components of the "bgr"—converted image data undergoes image blur correction filtering (S9). Processed image information 21 is obtained from the image data that has undergone image blur correction filtering.

[1] Noise Filtering 1

Figure 3:
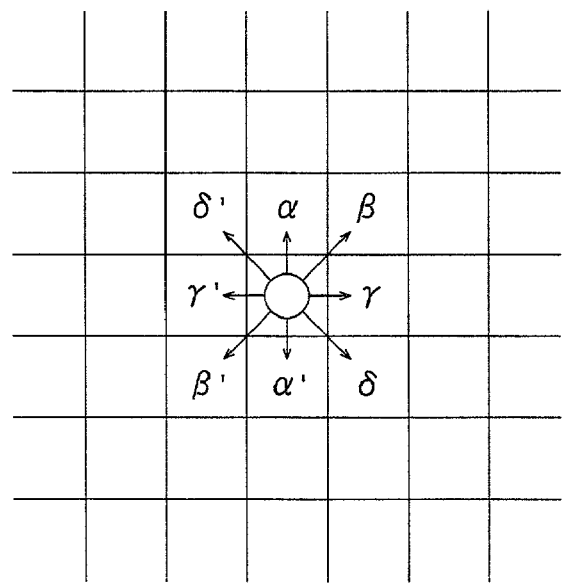
FIG. 3 is an explanatory diagram of noise filtering.

Next, noise filtering is described. FIG. 3 is an explanatory diagram of noise filtering. Assume that in this figure, "a" is the pixel to undergo processing and "α", "α'", "β", "β'", "γ", "γ'" "δ", and "δ'" are the pixel values of the pixels which surround pixel "a". The point-symmetrical sets in the figure are defined as follows:

[α]=α, a, α' (3 points)

[β]=β, a, β' (3 points)

[γ]=γ, a, γ' (3 points)

[δ]=δ, a, δ' (3 points)

where differential information can be obtained using the following expression:

$$\Delta\alpha = abs(\alpha - a) + abs(\alpha' - a)$$

In the above expression, "abs (α–a)" denotes the absolute value of "α–a". Expressions similar to the above can also be used to calculate $\Delta\beta$, $\Delta\gamma$, and $\Delta\delta$.

And the minimum value of all $\Delta\alpha$, $\Delta\beta$, $\Delta\gamma$, and $\Delta\delta$ data, is taken as $\Delta min$. After this, if a certain threshold value A is greater than $\Delta min$, "a" will be replaced with the weighted average of the three points relating to $\Delta min$.

More specifically, if $\Delta\alpha$ is equal to $\Delta min$, the weighted average is represented by the following expression:

$$\text{Weighted average} = (\alpha + a + \alpha')/3$$

This value is defined as a new pixel value "a". Or when the source image is to undergo gentle noise reduction, the following expression can be used:

$$\text{Weighted average} = (\alpha + 2a + \alpha')/4$$

It is possible by adopting the above-described configuration to reduce strong image noise with the edge of image information being left intact. Also, according to this embodiment, since greater information differences than the threshold value are not smoothened, edge information can be left intact more easily.

Figure 4:
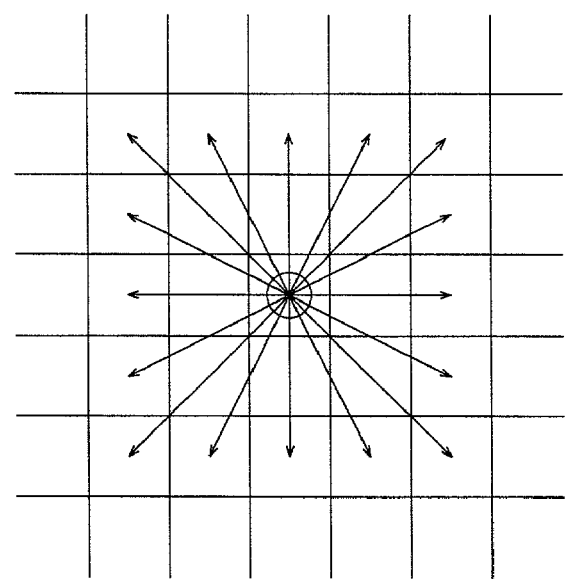
FIG. 4 is another explanatory diagram of noise filtering.

Although the above description applies to the case that the eight points surrounding the noticed pixel undergo noise filtering, the present invention is not limited by such filtering; it is possible to skip the pixels that surround "a", and provide the next set of pixels with filtering, as shown in FIG. 4.

Next, another method of filtering is described below. Similarly to processing described above, differential information is obtained and then the minimum value is derived from four sets of differential information. Processing up to this step is the same as processing described above. If the minimum value is smaller than the first threshold value, control advances to the following process. That is to say, the value obtained by adding a constant "const" to the above-mentioned minimum value is defined as a new threshold value. Of all the above-mentioned four sets of differential information, only those smaller than the above-mentioned new threshold value are extracted. The average value of the pixel data contained in the sets which have thus been extracted is taken as the value of the noticed pixel. And processing mentioned above is conducted for the entire screen area.

Figure 5:
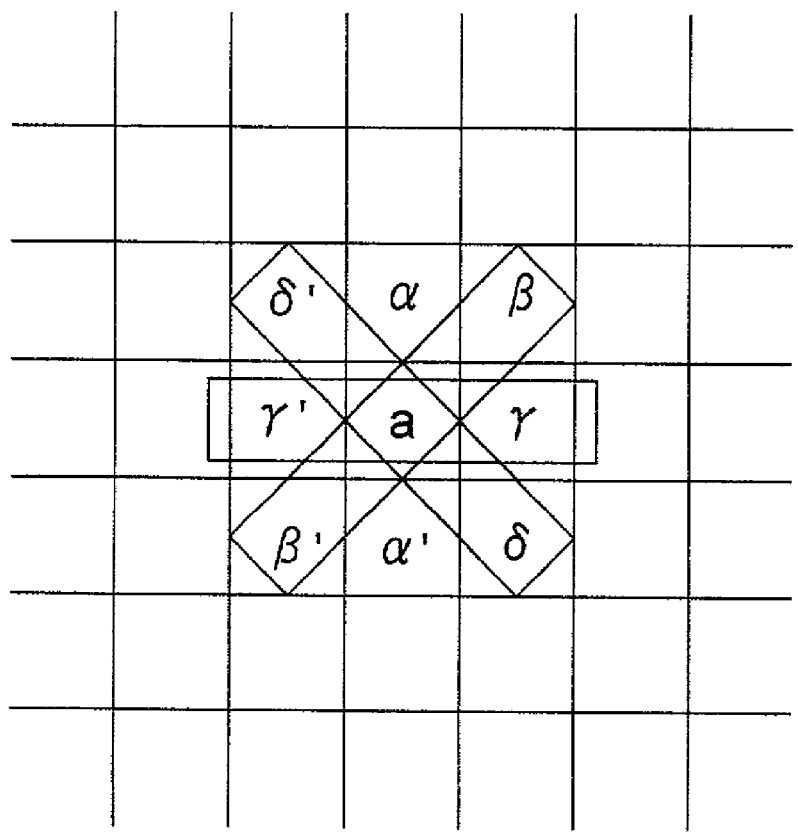
FIG. 5 is yet another explanatory diagram of noise filtering.

FIG. 5 is yet another explanatory diagram of noise filtering. This figure shows an example of 3×3 filtering. Assume that the set consisting of "δ", "a", and "δ'", the set consisting of "β", "a", and "β'" and the set consisting of "γ", "a", and "γ'", are smaller than the value obtained by adding "const" to the minimum value. At this time, the weighted average of point "a" is represented by the following expression:

$$(\beta + \beta' + \gamma + \gamma' + \delta + \delta' + a)/7$$

The new value that has thus been obtained is taken as "a". According to this method, the noticed pixel having a significantly great value can be provided with strong filtering. In the above expression, weighting can be conducted as required. For example, a new value can be calculated as follows:

$$(\beta + \beta' + \gamma + \gamma' + \delta + \delta' + 2a)/8$$

According to this embodiment, since greater information differences than the threshold value are not smoothened, it is possible to provide filtering that permits edge information to be left intact more easily.

According to the present invention, it is possible to conduct above-described noise filtering on the source image first, then set the required threshold value smaller than the above-mentioned threshold value, and provide noise filtering that smoothens image signals lower than the required threshold value.

According to this method, since strong noise components are suppressed by above-described image processing beforehand, noise can be reduced over a wide range and with a small threshold value, with the result that effective noise reduction can be accomplished without damaging the details of the image.

Also, since the source image mentioned above is an image that has been obtained by gradation conversion of the image input signal data obtained from an image input unit, the above-mentioned threshold value can be derived from the gradation conversion characteristics of signal data close to that of the pixel which is to undergo image processing.

According to this method, high image reproducibility can be obtained over a wide range from highlighted portions to shadow portions since the noise processing level can be changed according to the amount of noise encountered during gradation conversion.

Figure 6:
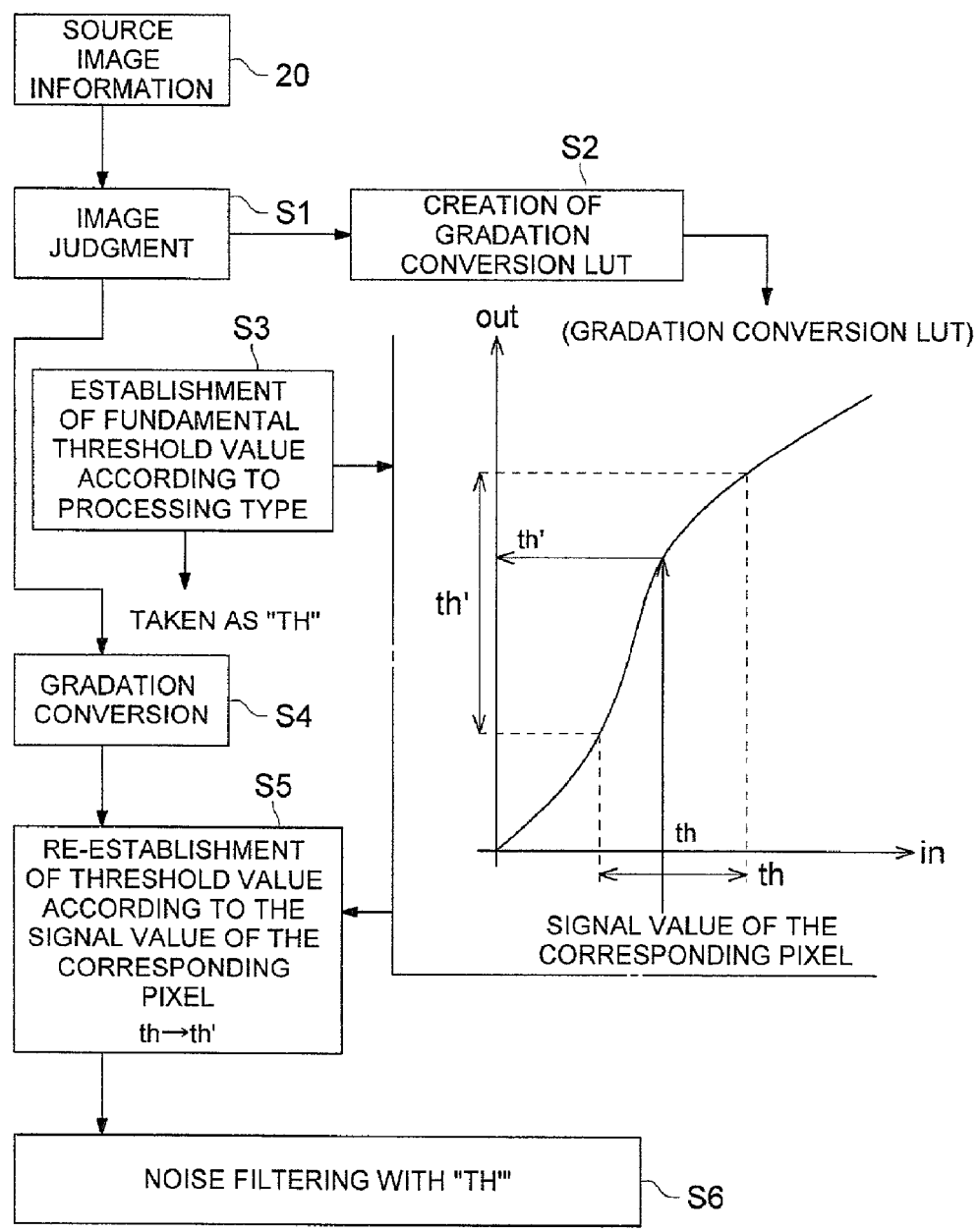
FIG. 6 is an explanatory diagram of the calculation method for the threshold values used for noise filtering.

FIG. 6 is an explanatory diagram of the calculation method for the threshold values used for noise filtering. First, source image 20 undergoes image judgment (S1). The image judgment is the same as that shown in FIG. 2. After the image judgment, a gradation conversion LUT based on image judgment results is created (S2). The horizontal axis of this LUT denotes changes in the input signal value of the noticed pixel, and the vertical axis denotes changes in the input signal value existing after the conversion.

For instance, for a color negative type of original paper, under-exposure due to photographing trouble deteriorates the gradation of shadows (the image results in lack of contrast). When such an image is acquired using a scanner, similar noise will have been superimposed on both gradation-deteriorated portions and normal other portions. If the image is judged to be under-exposed, the contrast of the shadows can be increased, and thus the sharpness of black can be improved, by providing LUT processing that enhances the damaged portions of the image, and as a result, preferable photographic reproducibility can be obtained. The noise level mentioned above, however, will also increase with the increase in the contrast. The LUT shown in FIG. 6 is for providing the shadows with steep gradation conversion in order to improve the contrast of the under-exposed portions of the image. The horizontal axis denotes changes in the input signal value of the noticed pixel, and the vertical axis denotes changes in the input signal value. In this case, the fundamental threshold value "th" appropriate for the particular type of processing is set (S3).

After the image judgment in step S1, LUT-based gradation conversion occurs in step S4. As described above, when gradation conversion occurs, the noise superimposed on the image will also change. In step S5, therefore, the threshold value is re-set according to the particular signal data of the noticed pixel. That is to say, the threshold value is changed from "th" to "th'". In step S6, such noise filtering as described earlier in this document occurs using "th'". Hereby, a preferable noise reduction effect can be obtained, even after various gradation conversions have been performed.

Figure 7:
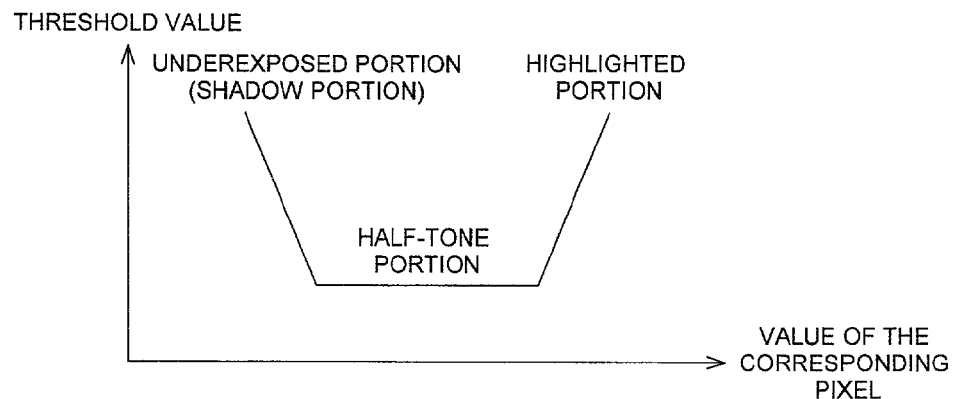
FIG. 7 is an explanatory diagram showing an example of general threshold value setting.

FIG. 7 is an explanatory diagram showing an example of general threshold value setting. The horizontal axis denotes changes in the value of the noticed pixel, and the vertical axis denotes changes in threshold value. When gradation conversion occurs, since noise easily becomes superimposed on both highlighted and shadow portions, the threshold value is increased for stronger suppression of noise. For the half-tone portion, a trifle small threshold value is set because the image itself is clear and because almost no noise is induced thereinto. According to this embodiment, the optimal threshold value for noise filtering can be obtained.

[2] Scaling Coefficient Changing

Figure 8:
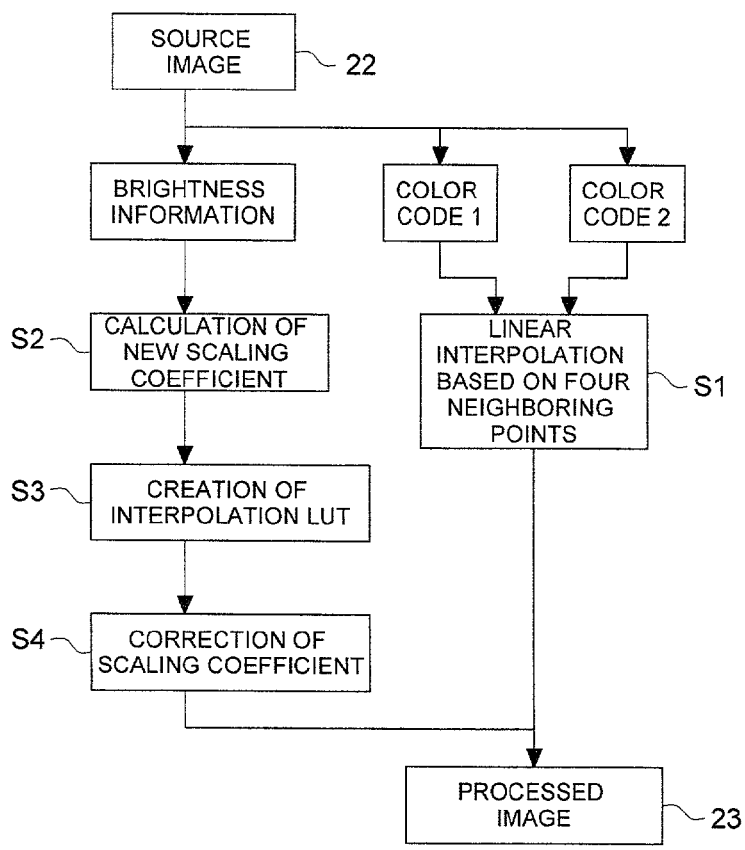
FIG. 8 is a flowchart showing a scaling coefficient changing method.

FIG. 8 is a flowchart showing a scaling coefficient changing method. Brightness information, color code 1, and color code 2 are calculated from source image 22. Brightness information is derived from expression (1), chrominance coded information 1, from expression (2), and chrominance coded information 2, from expression (3). Linear interpolation based on four neighboring points is used for chrominance coded information 1 and chrominance coded information 2 (S1).

Figure 9A:
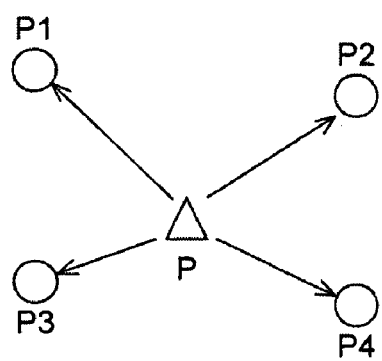
FIG. 9(a) and FIG. 9(b) are explanatory diagrams of linear interpolation.

FIG. 9(a) is an explanatory diagram of linear interpolation based on four neighboring points. Points 1 to 4 in this figure denote existing pixel data. Also, "p" denotes a new pixel created during the scaling coefficient changing process. Pixel P at this point is represented by the following expression in which the coefficients that have been calculated according to the distance between existing pixels and "p" are taken as "d1" to "d4":

$$P = p1 \cdot d1 + p2 \cdot d2 + p3 \cdot d3 + p4 \cdot d4$$

where "d1+d2+d3+d4"=1.0

If point "p" and the original pixel overlap, the above expression is not used and the original pixel data is used as it is.

Figure 9B:
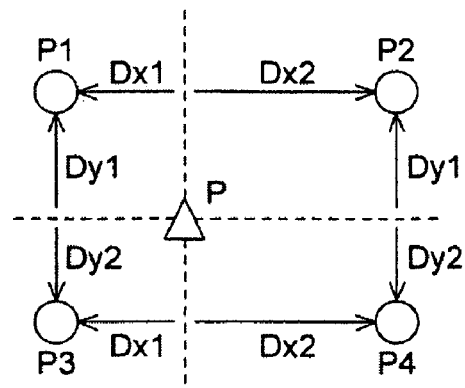

As shown in FIG. 9(b), the actual values of "d1" to "d4" can be calculated as follows by calculating x-axial (horizontal) weighting coefficients Dx1 and Dx2 and the y-axial (vertical) weighting coefficients Dy1 and Dy2:

$$d1 = Dx1 \cdot Dy1$$

$$d2 = Dx2 \cdot Dy1$$

$$d3 = Dx1 \cdot Dy2$$

$$d4 = Dx2 \cdot Dy2$$

Figure 10:
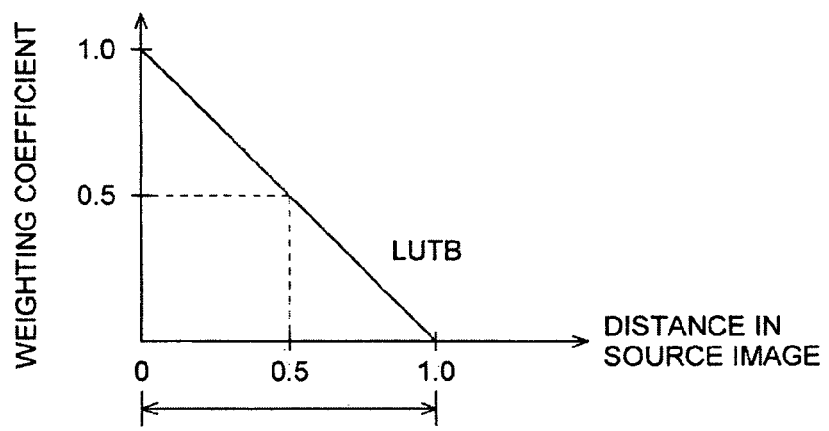
FIGS. 10(a), 10(b) and 10(c) are explanatory diagrams of interpolation calculation LUT creation.
Figure 10:
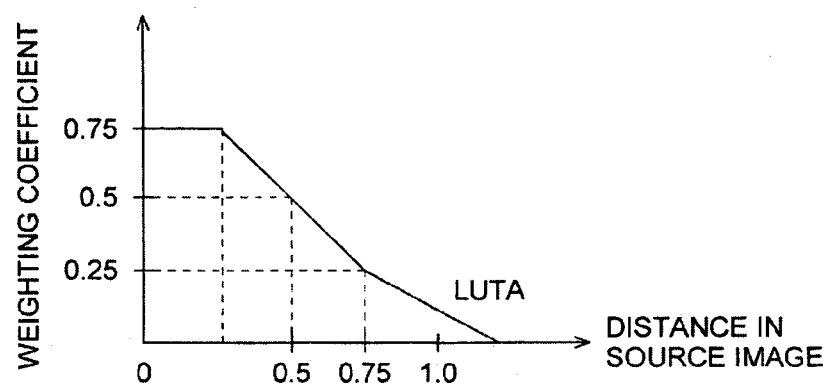
Figure 10:
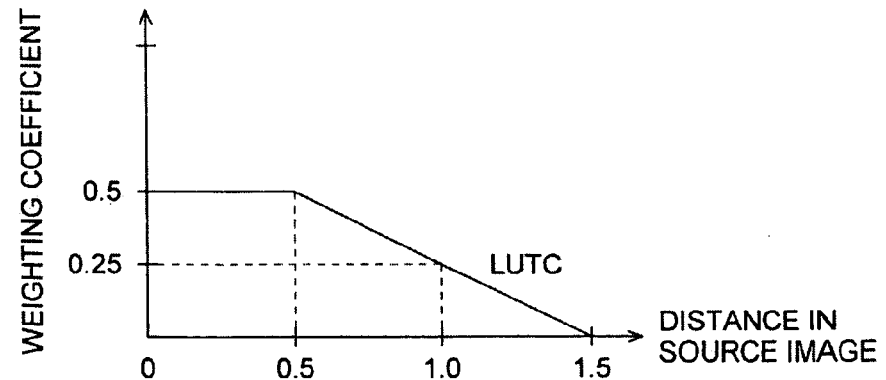

When, in FIG. 8, the scaling coefficient changing process is performed on brightness information, the scaling coefficient changing ratio is calculated first (S2) and then an calculation LUT for interpolation is created (S3). FIG. 10 is an explanatory diagram of interpolation calculation LUT creation. An example of four-point interpolation, an example of nine-point interpolation, and another example of nine-point interpolation are shown in FIG. 10(a), (b), and (c), respectively. In the figure, the distance in the source image is plotted along the horizontal axis, and the distance between grids (in FIG. 9(a), the distances from "p1" to "p2", from "p2" to "p4", from "p1" to "p3", and from "p3" to "p4") is represented as 1.0. Changes in weighting coefficient are plotted along the vertical axis.

In the example of four-point interpolation in (a), as the distance from the new pixel increases, the weighting coefficient decreases, and when the distance from the new pixel exceeds 1.0, the weighting coefficient decreases to zero. The characteristics of the LUT in the example of nine-point interpolation are shown in (b), and in this characteristics curve, the coefficient is slightly made valid, even for the distances that exceed 1.0.

The characteristics of the LUT in another example of nine-point interpolation are shown in (C), and in this characteristics curve, the weighting coefficient is made valid for grid-to-grid distances up to 1.5. The LUT having the characteristics of (a), the LUT having the characteristics of (b), and the LUT having the characteristics of (c) are defined as LUTB, LUTA, and LUTC, respectively. In the case of LUTA, since the weighting coefficient is also valid for grid-to-grid distances up to 1.0, the occurrence of moire-like noise can be suppressed. In the case of LUTC, since the weighting coefficient is valid for grid-to-grid distances up to 1.5, a greater moire reduction effect than in the case of LUTA can be obtained.

Figure 11:
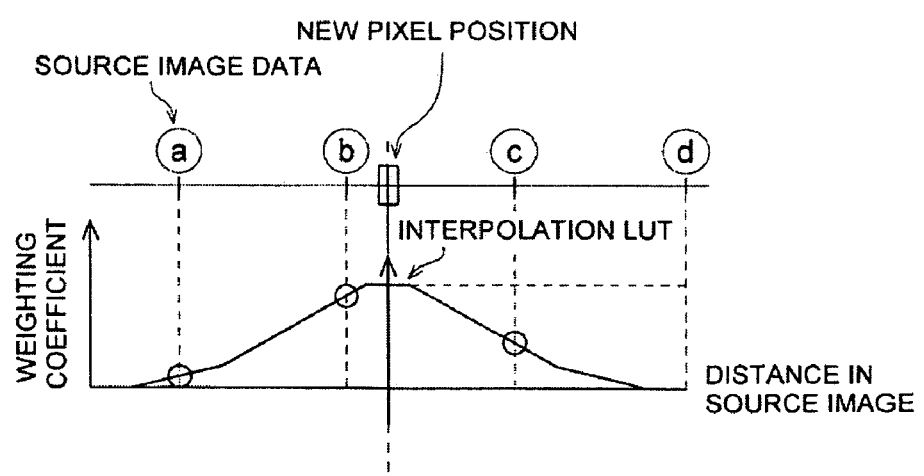
FIG. 11 is an explanatory diagram of scaling coefficient changing based on LUTS.

Reference is now returned to FIG. 8. After the calculation LUT for interpolation has been created, the scaling coefficient changing is performed (S4). FIG. 11 is an explanatory diagram of scaling coefficient changing based on LUTs. In this figure, rail to "d" denote source image data and "□" denotes a new pixel position. Suppose that the LUT having the characteristics shown in the figure is used as the interpolation LUT. In this case, a weighted-addition average value based on the three points ("a" to "c") at which the weighting coefficient is not zero is defined as the data corresponding to the new pixel position. At point "d", the weighting coefficient does not work since it is zero. In this case, for a two-dimensional plane image, interpolation based on nine neighboring points occurs since the weighting coefficients of the pixel values at a maximum of nine vertical and horizontal points take values other than zero.

Figure 12:
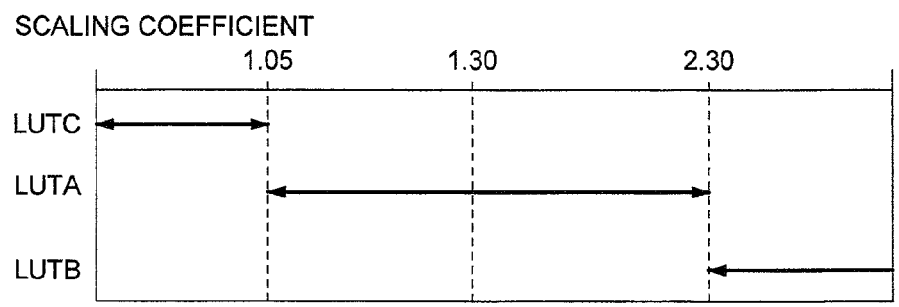
FIG. 12(a), FIG. 12(b) and FIG. 12(c) are diagrams showing an example of changes in weighting based on scaling coefficient coefficients.
Figure 12:
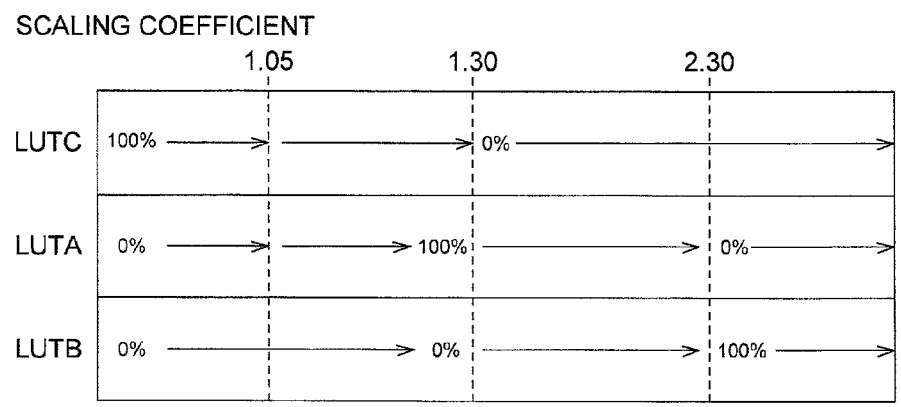
Figure 12:
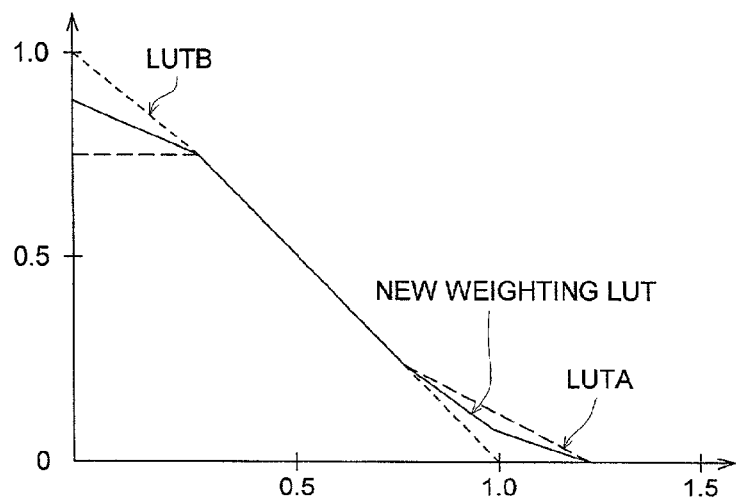

FIG. 12(a) is a diagram showing an example of changes in weighting based on scaling coefficient changing ratios. The LUTA, LUTB, and LUTC in this figure are the LUTs that were defined in FIG. 10. For example, in the case of 300-dpi image linear interpolation, since moire noise may occur at scaling coefficient changing ratios up to about 1.05, nine-point interpolation based on LUTC is used. Also, for a scaling coefficient changing ratio from 1.05 to 2.30, nine-point interpolation based on LUTA occurs, and for a scaling coefficient changing ratio exceeding 2.3, four-point interpolation based on LUTB can be used since almost no moire noise occurs. It can be seen from FIG. 12(a) that the type of LUT is changed according to the particular scaling coefficient changing ratio. As described above, according to this embodiment, when the scaling coefficient of an image is changed, moire-like noise and other defects can be reduced since the appropriate interpolation process is performed for each color component.

FIG. 12(b) shows an example in which the LUT for calculating a new weighting coefficient is to be re-created by conducting weighting syntheses on two types of LUTs according to the desired new scaling coefficient. In other words, this method is not by selecting one LUT according to the desired new scaling coefficient. In FIG. 12(b), for example, when the desired new scaling coefficient is somewhere in between 1.30 and 2.30, a weighting LUT consisting of LUTA and LUTB at the rate of 50% each is created and this LUT is used as a new weighting LUT. Such an example of LUT is shown in FIG. 12(c). The weighting value can be precisely set in the range from 0% to 100%.

For example, if the image is to be reduced in size and the reduction ratio is 1/2, when one pixel is formed between the original two pixel points, detailed information of the image will usually be lost because of mere pixel skipping. In such a case, nine-point interpolation that uses surrounding pixel data as well will bring about processing results with minimum loss of information.

As described above, the use of a different spatial interpolation process according to the particular new scaling coefficient for the enlarging or reducing of the image enables the interpolation processes that suit various new scaling coefficients, and consequently, enables highly accurate and preferable image processing. Furthermore, according to the embodiment shown in FIG. 12(b), even when the specified scaling coefficient is adjusted precisely by taking a weighted average from a plurality of LUTs according to the specified new scaling coefficient and creating a new spatial interpolation LUT, more stable processing characteristics can be obtained since spatial interpolation characteristics can be set more precisely.

Also, according to the present invention, in the case that as shown in FIG. 8, the components of the image information consist of at least three dimensions of information, namely, one dimension that denotes brightness, and at least two dimensions that denote chrominance coded information, highly accurate interpolation with minimum defects (such as moire noise) can be conducted for brightness information by applying, to the dimension that denotes brightness, a spatial interpolation process different from that of chrominance coded information and further changing the spatial interpolation process according to the specified new scaling coefficient. Furthermore, for the remaining chrominance coded information, both high-accuracy processing and high-speed processing can be implemented since a spatial interpolation process relatively high in processing speed is applied.

Figures 13, 14:
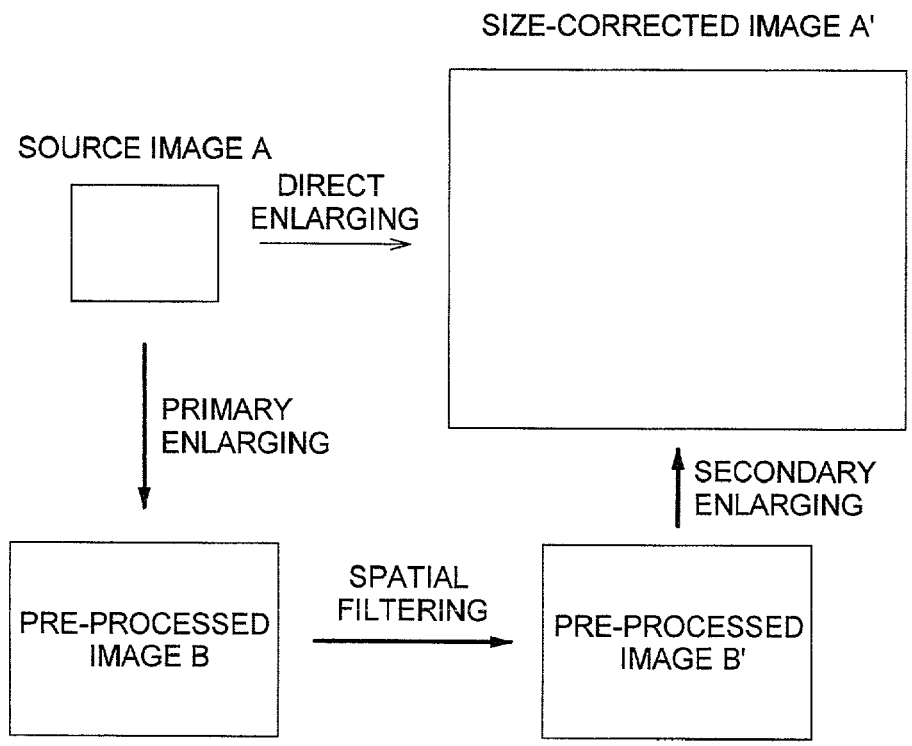
FIG. 13 is an explanatory diagram that shows other operation related to image scaling coefficient changing.
FIG. 14 is a diagram showing the relationship between measures of scaling coefficient changing ratios and enlarge/reduce processing.

FIG. 13 is an explanatory diagram that shows other operation related to image scaling coefficient changing (in this example, enlarging). A primary enlarging operation is performed on source image A to create a half-tone image B, and after half-tone image B has been created, a spatial filtering process is performed on this half-tone image B to obtain a half-tone image B'. The half-tone image B' that has thus been obtained is then provided with secondary enlarging to obtain size-corrected final image A'. The following relational expression holds between the direct scaling coefficient changing ratio, the primary scaling coefficient changing ratio, and the secondary scaling coefficient changing ratio:

Direct scaling coefficient changing ratio=Primary scaling coefficient changing ratio×Secondary scaling coefficient changing ratio In actual operation, with the primary scaling coefficient changing ratio remaining fixed, when the direct scaling coefficient changing ratio is increased above a certain value, it is possible to change processing automatically from one-step processing to two-step processing or to make the desired scaling coefficient changing method selectable and specify one-step or two-step processing beforehand as required. An example representing the relationship between measures of scaling coefficients and the enlarge/reduce process is shown in FIG. 14. For enlarging, the primary scaling coefficient ranges from 1.3 to 1.8 and when the direction scaling coefficient changing ratio oversteps the range from 1.9 to 2.0, two-step processing will be selected. For reduction, the primary scaling coefficient ranges from 0.6 to 0.7 and when the direction scaling coefficient changing ratio decreases below the range from 0.6 to 0.52, two-step processing will be selected.

According to this embodiment, when the specified new scaling coefficient for the enlarge/reduce process is greater than the required value, the scaling coefficient changing process will be repeated until a predetermined pre-processing magnification is achieved, and then after spatial filtering has been provided, scaling coefficient changing to the remaining usable scaling coefficients will be further continued. Thus, the defects that the image lacks smoothness, such as the event that information is lost during reduction or that the original shape of the pixel is visible during enlarging, can be reduced when strong enlarge/reduce processing is provided.

Figure 15:
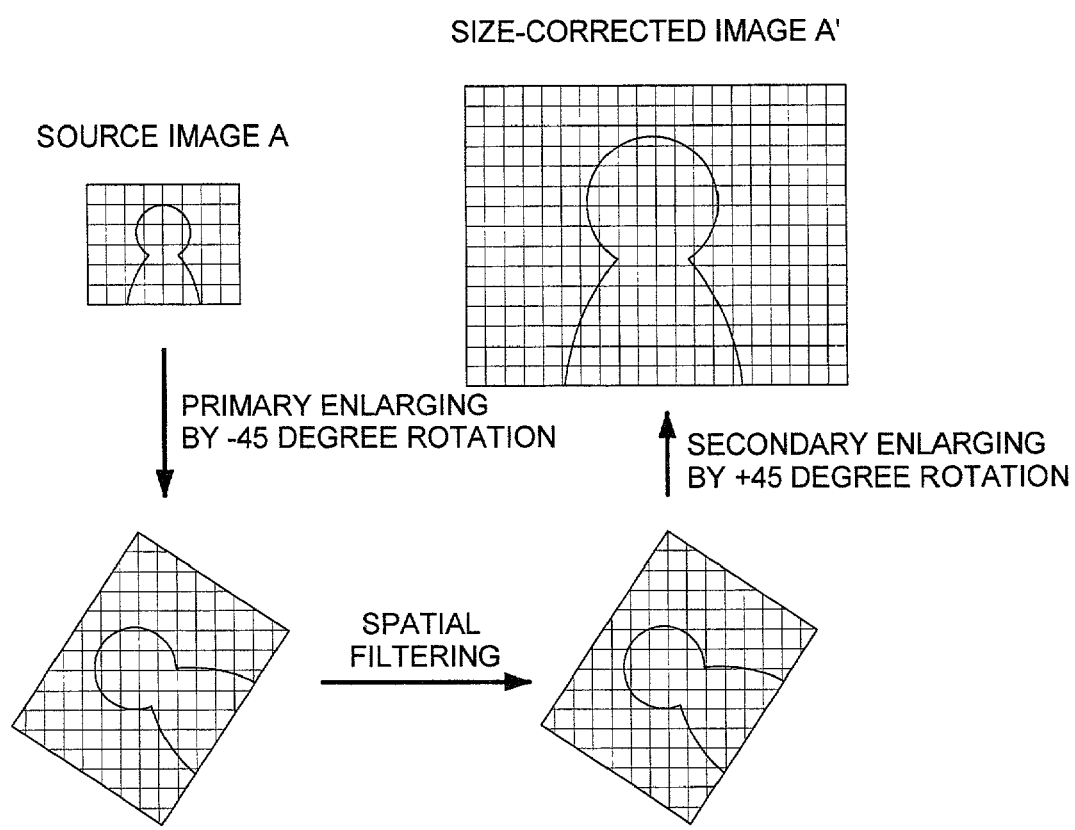
FIG. 15 is an explanatory diagram of other scaling coefficient changing methods.

FIG. 15 is an explanatory diagram of other scaling coefficient changing methods. If the image size of source image A is changed in an attempt to enlarge the source image A and obtain a size-changed image A', the pixel grid pattern may appear strongly. For primary enlarging, therefore, the image size is changed while the image is being rotated through 45 degrees. After the size change, the image is provided with spatial filtering. Secondary enlarging of the spatially filtered image results in the desired image A' as the size-changed image. In this case, a further size change by 45-degree rotation in the opposite direction returns the direction of the image to the original direction. By changing the pixel grid array in this way during spatial filtering, the source image can be enlarged to a size at which the pixel grid pattern of the image is not obvious, even when an enlarging ratio greater than, for example, three times the original image size is required.

Although a combination of rotational angles of 45 degree and −45 degree of reverse direction is employed in the above-mentioned example as a desirable embodiment of the present invention, the scope of the present invention is not limited to the above combination It is also applicable that an appropriate rotational angle, other than orthogonal angles (including 0 degree, 90 degree, 180 degree, 270 degree, - - - ), selected in a range of, for instance, 15–75 degree, could be applied for the primary enlarging and rotating operation, and then, the same rotational angle of reverse direction is employed for the secondary enlarging and rotating operation.

When these scaling coefficient changing processes shown in FIGS. 13 and 15 are included in the flowchart of FIG. 2, the resulting new flowchart will be such that same processing is applied in up to step S3, primary scaling coefficient changing is applied to step S4, and secondary scaling coefficient changing is inserted between steps S6 and S7.

[3] Noise Filtering 2

Figure 16:
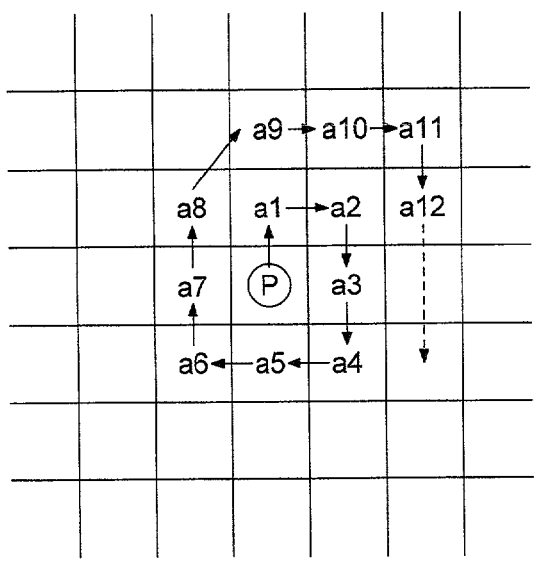
FIG. 16(a), FIG. 16(b) and FIG. 16(c) are explanatory diagrams of other noise filtering processes.
Figure 16:
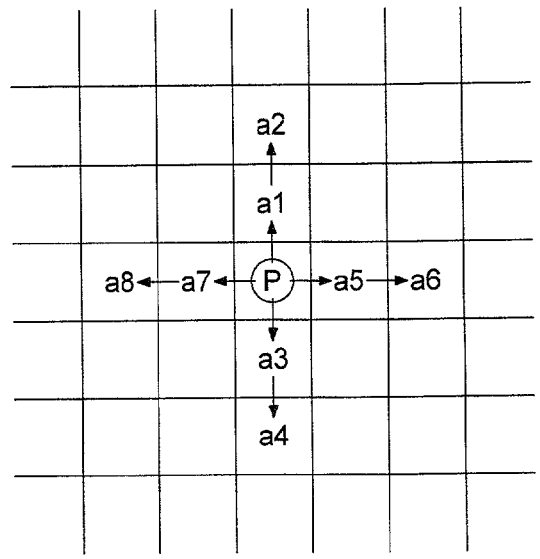
Figure 16:
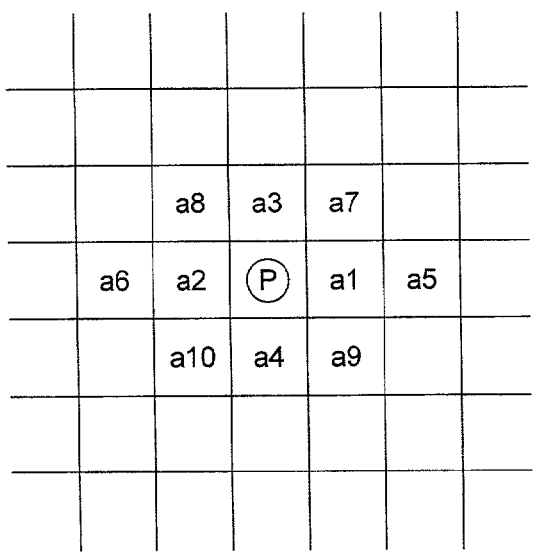

FIG. 16 is an explanatory diagram of other noise filtering processes. Filtering relating to patterns (a) to (c) is described below. This filtering process is performed to compare data between the noticed pixel and peripheral pixels first, then add pixel data until the pixel whose differential information value (usually, absolute differential value) exceeds the required threshold value has appeared, and take the average of the added data as the value of the noticed pixel.

Patterns (a) to (c) are shown to explain the order of comparison between the central (target) pixel "p" and peripheral pixels "ai" (where "i" takes values of 1, 2, 3, etc.). Pattern (a) is for comparing pixels spirally from the center. Pattern (b) is for radial comparison, in which case a wide range of filtering can be executed at relatively high speed. Pattern (c) is of the type matched to computation with a currently available microprocessor, and comparison between pixels present nearby on a computer memory is sequentially privileged.

For example, if the number of pixels which have been extracted is five, after-conversion pixel value P can be calculated using the following expression:

$$P=(p+a1+a2+a3+a4+a5)/(5+1)$$

In the above example, by setting, as the required threshold value, small enough a value in comparison with that of above-mentioned noise filter 1 (for example, from 0.7 to 0.5 times or less) and setting, as the maximum range for performing comparisons with peripheral pixels, wide enough a range in comparison with the extraction range of above-mentioned noise filter 1 (for example, from 1.5 to 2.0 times or more), a strong filtering effect against noise can be obtained and image processing results high in the reproducibility of edges and image details can be obtained.

The example described above applies to additive averaging of all pixel points consisting of extracted pixel points "a1" to "a5" and central (target) pixel point. This additive averaging calculation process can likewise be performed by further rearranging all six pixels points, namely, extracted pixel points "a1" to "a5" and the central (target) pixel point, in normal ascending order (or descending order) of magnitude and using only four of the six pixel points, except those which have the maximum and minimum values. Hereby, among all the extracted pixels, only those which are most likely to contain stronger noise components can be removed efficiently, and consequently, a greater noise reduction effect can be obtained.

Although the above example assumes that five pixels are extracted, when the number of pixels extracted is even larger, the averaging process can likewise be performed by rearranging extracted data in normal ascending order (or descending order) of magnitude and using only the pixels left after the required rate (for example, 10%) of data has been removed from both the data portion greatest in magnitude and the data portion smallest in magnitude.

In addition, image processing used during noise filtering 1 is not limited by the above description; it is also possible to use the various processing methods described in connection with above-described noise filtering 2 and to set, as the corresponding threshold value, a value smaller than that of noise filter 2 (for example, from 0.7 to 0.5 times or less) and set, as the maximum range for performing comparisons with peripheral pixels, a range wider than the extraction range of noise filter 2 (for example, from 1.5 to 2.0 times or more). Thus, processing results with a smooth and high noise reduction effect can be obtained.

[4] Resolution Enhancement Filtering

Figure 17:
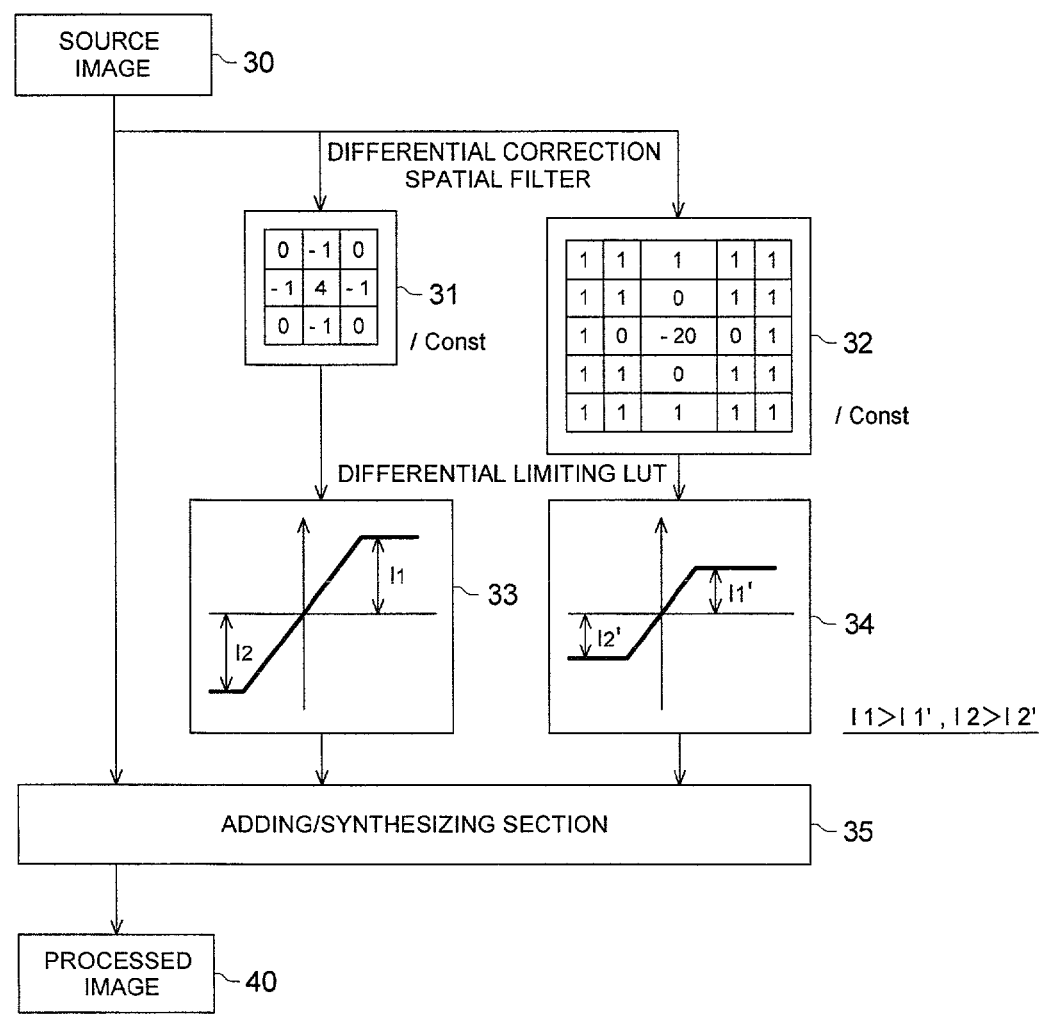
FIG. 17 is an explanatory diagram of a sharpness enhancement process.

Resolution enhancement filters are applied to brightness data as described earlier in this document. FIG. 17 is an explanatory diagram of a sharpness enhancement process. Source image 30 enters differential spatial filters 31 and 32. Filter 31 enhances amplitude. Filter 32 suppresses amplitude. The "Const" shown in the figure is a coefficient for adjusting differential information, and as the value increases, the effectiveness of the filter decreases. Filters 31 and 32 are maintained in the relationship that the respective positive and negative coefficients become opposites. Numeral 33 denotes a differential limiting LUT for limiting the output of spatial filter 31 in terms of amplitude, and numeral 34 denotes a differential limiting LUT for limiting the output of spatial filter 32 in terms of amplitude. The horizontal axes of amplitude limiting LUTs 33 and 34 denote calculated data, and the vertical axes denote the data to be added/synthesized. If the vertical amplitude values of differential limiting LUT 33 are taken as 11 and 12, respectively, and the vertical amplitude values of differential limiting LUT 34 are taken as 11' and 12', respectively, the LUTs will be constructed so that the following expression holds:

$$11>11', \ 12>12' \tag{4}$$

Numeral 35 denotes a adding/synthesizing section that adds/synthesizes source image data and the output values of differential limiting LUTs 33 and 34. A processed image 40 is obtained from the adding/synthesizing section 35. The operation of the sharpness enhancement filters which have thus been constructed is described below.

The source image enters differential spatial filters 31 and 32, where the respective filtering processes are then performed. FIG. 18 is an explanatory diagram of the operation of such a spatial filter. In this figure, (a) denotes a spatial filter and (b) denotes image data. The value of the filter is defined as shown in (a), and data of the image is defined as shown in (b). If the noticed pixel in the image is taken as "p", the filtering results "p'" obtained after the arithmetic operations for filtering have been performed are represented by the following expression:

$$P'=P+\{\alpha \times p+\beta \times (a1+a3+a5+a7)+\gamma+ (a2+a4+a6+a8)\} \div Const. \quad (5)$$

In the present invention, the results can be represented by the following expression by further LUT operation:

$$P'=P+LUT[\{\alpha \times p+\beta \times (a1+a3+a5+a7)+\gamma \times (a2+a4+a6+a8)\} \div Const.] \quad (6)$$

The reason why the two filters are provided is described below. FIG. 19 is a diagram in which the position and data of one cross section of the image acquired from a film are plotted along the horizontal axis and the vertical axis, respectively. FIG. 19(a) shows unprocessed image data. Hereinafter, waves mean those present on image spaces. As shown in the figure, each film image includes a wave U short in wavelength, and a wave W long in wavelength, the waves of both denote noise due to the grains in the film. Here, the wave U short in wavelength does not pose any problems since it cannot be readily identified as a noise component. The long-wavelength wave W shown in the figure, however, causes the granular status to be observed improperly according to the particular image processing conditions. The long-wavelength wave W must therefore be removed using filter 32. FIG. 19(b) shows processed film status. It can be seen from the figure that the long-wavelength wave W has been removed.

For the necessary image information elements I1 and I2, on the other hand, since the amplitude of I1 is greater than that of I1' or I2', the corresponding amplitude is not suppressed, and since I2 is an image of a short wavelength, this image is not suppressed, either. After these elements have been suppressed, an image preferable in terms of granularity and high enough in sharpness can be obtained by enhancing waves principally of short wavelengths. The strong noise occurring at irregular periods will be present in images. The amplitude of LUT 33 is limited so that image quality will not be deteriorated by the enhancement of such noise during gradation conversion. LUT 34 also has its own upper limit value to minimize changes in image data by reducing the granular noise in film images.

Such magnitude relationship as shown in expression (4) is provided for the amplitude limit values of LUTs 33 and 34, since LUT 33 needs to achieve greater values of I1 and I2 by providing sufficient amplitude enhancement and LUT 34 needs to achieve smaller values of I1' and I2' by saving information other than granular noise components.

Figure 20:
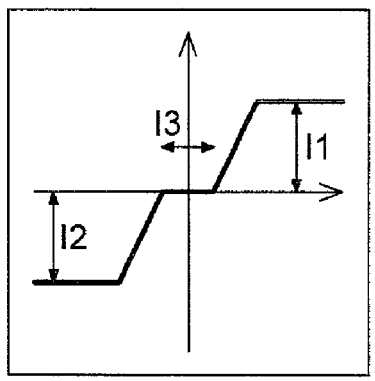
FIG. 20(a) and FIG. 20(b) are diagrams showing another example of the configuration of a differential limiting LUT.
Figure 20:
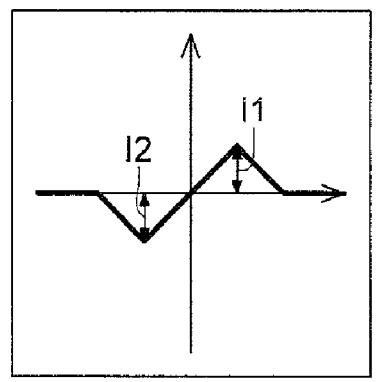

FIG. 20 is diagram showing another example of the configuration of a differential limiting LUT. In FIG. 20(a), the synthesized value in the area represented by I3 is set to zero. This is effective for achieving the reproducibility (continuity) of gradation. The characteristics shown in FIG. 20(b) are effective for obtaining high contrast, since the granular noise in silver salt photographs is removed and at the same time, the synthesized value in the area against image data of great amplitude is set to zero.

The method of calculating I1, I2, and I3, is described below. When I1 and I2 are calculated, processing actually occurs and the optimal data is derived visually. For exposure on negative-type photosensitive paper, I1>I2 is preferable. In this case, I1 needs to be the value that increases brightness (in other words, reduces density).

Figure 21:
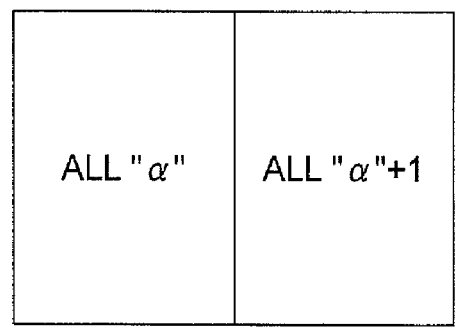
FIG. 21 is a diagram showing an example of the patterns used to calculate 13.

When I3 is calculated, it can be calculated similarly to the calculation of I1 and I2. Or filters effective for improving gradation reproducibility can be set by setting these filters so that when the patterns shown in FIG. 21 undergo processing, strong edge enhancement will not be provided at the boundary of the patterns. In FIG. 21, data consisting of all "α" pixel values, and data consisting of all "α+1" pixel values are adjacent.

As described above, according to this embodiment, the strong noise appearing as white spots and/or black spots on the image can be suppressed since the required maximum allowable data variation is provided for each data variation existing before and after spatial filtering of image data and since image processing is provided in a range not overstepping the maximum allowable data variation.

Also, since a plurality of spatial filtering processes different in characteristics are performed either simultaneously in parallel or in sequence, the noise suppression effect corresponding to the characteristics of the filters can be obtained by providing the maximum allowable data variation corresponding to each spatial filtering process different in characteristics.

In addition, according to this embodiment, it is possible to perform noise-suppressed sharpness enhancement processes and, at the same time, to effectively suppress the characteristic low-frequency noise of silver salt films and the chroma noise usually induced into digital images, by providing a first spatial filter having the characteristic that it enhances the amplitude of a certain spatial frequency region, and a second spatial filter having the characteristic that it attenuates the amplitude of the region of spatial frequencies lower than those of the above-mentioned first spatial filter.

Furthermore, preferable reproduction of gradation images can be accomplished by adding the minimum allowable value to an absolute data variation associated with spatial filtering of the pixel data corresponding to each spatial filter.

[5] Image Blur Correction

When an image is printed using a printer of the optical exposure type, a specific section may be affected by colors present around it (and blurs due to the occurrence of flare or other events may result). Blurs also occur with other printers such as a thermal sublimating printer (since the responsiveness of their heating elements and other components is not rapid enough). These blurs deteriorate the contrast and sharpness of the image. Image blur correction is therefore provided to eliminate these effects. The image blur correction is performed for "b", "g", and "r" each, after, as shown in FIG. 2, brightness information, color code 1, and color code 2 have been converted into "bgr" data in step S8.

Figures 22, 23:
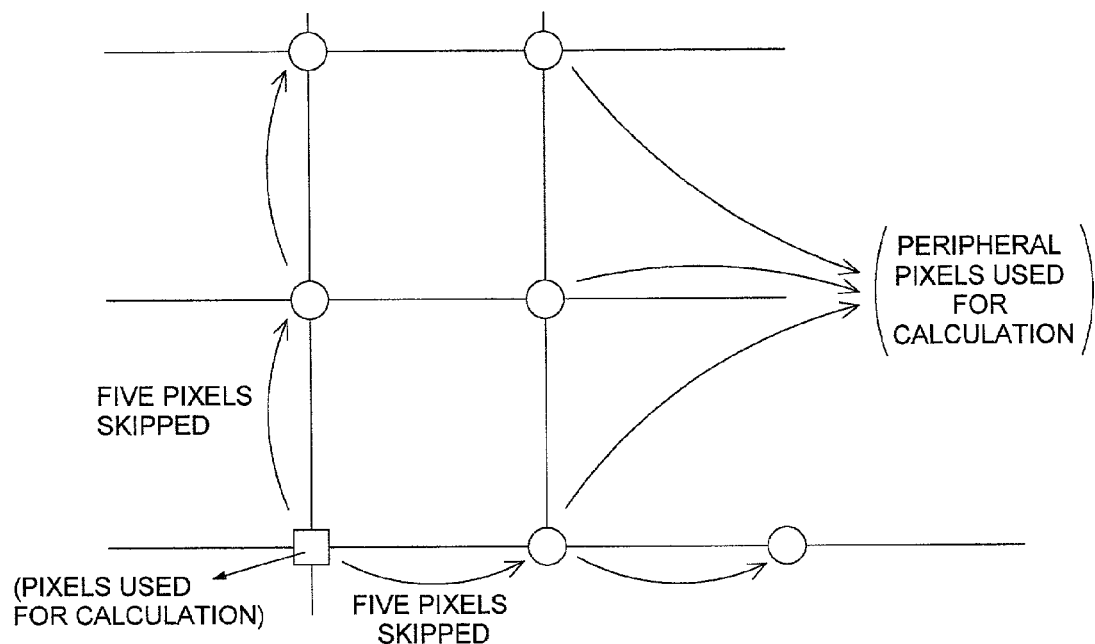
FIG. 22 is a diagram showing an example of the arrangement of the pixels to undergo blur correction filtering.

FIG. 22 is diagram showing an example of the arrangement of the pixels to undergo blur correction filtering. The pixels to be used to conduct calculations on, for example, every five other pixels around the pixel whose value is to be calculated are determined. Although only the top right portion is shown in the figure, pixels are also determined similarly at the top left, bottom left, and bottom right portions. And the corresponding image data is calculated using such filters as shown in FIG. 23. The coefficients for the top left, bottom left, and bottom right portions in these filters are also omitted in the figure. An arithmetic expression similar to expression (5) or (6) is used. The number of terms to be calculated, however, increases since the sizes of the filters are large. To perform image blur corrections, it is necessary to provide filtering by which any effects of peripheral pixels are canceled over a wide range. For this reason, it is possible to obtain a weak effect over a wide range and perform corrections for image blurs, by setting peripheral pixels over a wide range with respect to the pixel whose value is to be calculated, and determining large "Const" values using the coefficients corresponding to the peripheral pixel intervals shown in FIG. 23. The filter shown in FIG. 23(a) is for performing corrections on every five other pixels around the noticed pixel. These corrections enable calculation throughput to be reduced to about ⅕₅ of that required when all pixels in the same breath of area are to undergo calculation. Compared with the arrangement method shown in FIG. 23(a), such arrangement method as shown in FIG. 23(b), in which the position of each coefficient is skipped, requires a smaller number of calculation steps and thus enables faster processing.

Figure 25:
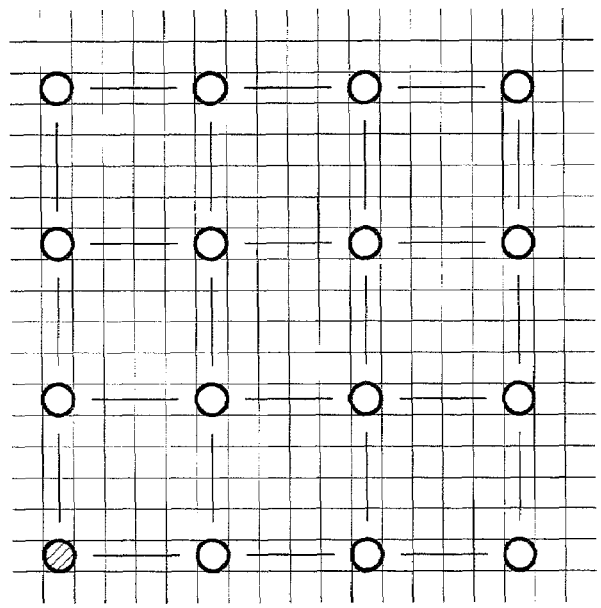
FIG. 25(a) and FIG. 25(b) are diagrams showing another example of the arrangement of the pixels to undergo blur correction filtering.
Figure 25:
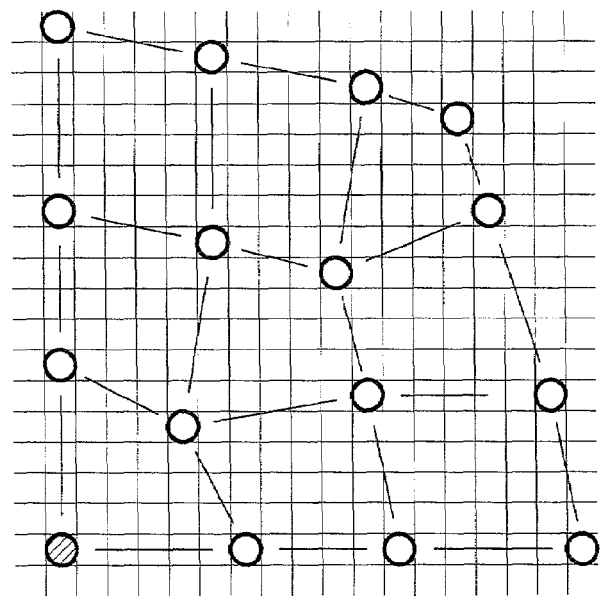

FIG. 25 is a diagram showing another example of the arrangement of the pixels to undergo blur correction filtering. Although, in the above description, as shown in FIG. 25(a), the peripheral pixels to be used for the calculation process have been extracted at intervals of five pixel points in vertical and horizontal directions with the central (target) pixel as the center, the pixels to be extracted as peripheral pixels can likewise be arranged in shifted form from regularly arranged grid points as shown in FIG. 25(b). By arranging pixels in this way, the blur correction process that has more accurate and smoother gradation reproducibility can be conducted without calculation throughput being increased.

Figure 26:
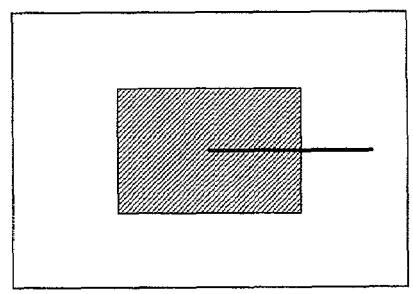
FIG. 26(a), FIG. 26(b), FIG. 26(c) and FIG. 26(d) are schematic diagrams showing the effectiveness of an embodiment.
Figure 26:
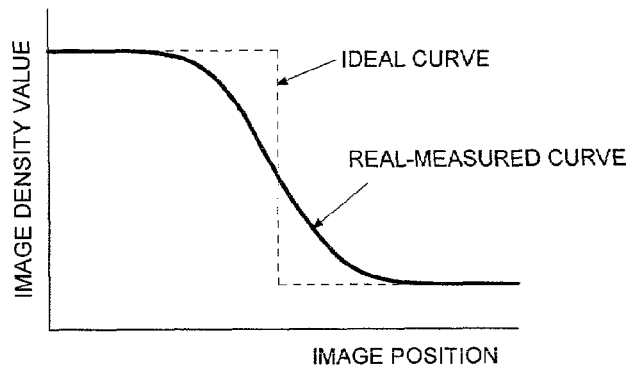
Figure 26:
Figure 26:

FIG. 26 is a schematic diagram showing the effectiveness of this embodiment. FIG. 26(a) represents the relationship between print density and the image position of one portion (in the figure, solid-line portion) of such edge-provided image as shown in FIG. 26(a), and is also a graph in which the image position is plotted along the horizontal axis and the print-reproduced image density value at that image position is plotted along the vertical axis. As shown in FIG. 26(b), in a processing system that provides no correction, the event that the image edge suffers blurring (in the case of photographic printing paper, light is diffused) prevents accurate edge reproduction (reproduction of a state such as a dotted line), thus blurring the edge. FIG. 26(c) is a graph showing the results obtained when peripheral pixels were extracted with the arrangement of FIG. 25(a) and blur correction was added in such a processing system. It can be seen from FIG. 26(c) that the blurring status of the edge is improved. Furthermore, FIG. 26(d) relates to the case that the arrangement of FIG. 25(b) is employed, and indicates that the blurring status of the edge is improved and that the nonuniformity of the density in an area around the edge has been removed to improve the smoothness of image reproduction. This is due to the fact that since the distance from the central (target) pixel and peripheral pixels is not constant and takes various values, the intensity of the blur correction filtering effect also changes slightly.

According to this embodiment, since low-frequency processing can be executed for each color component, changes in the characteristics of each color component in an image reading unit, an image writing unit, and the like, can be adjusted effectively.

According to this embodiment, it is also possible to perform a first spatial filtering process on, among all at least three dimensions of information consisting of brightness information, chrominance coded information 1, and chrominance coded information 2, only the component that denotes the brightness information, and then provide all information with blur correction, a second spatial filtering process for enhancing a spatial frequency region lower than that of the first spatial filtering process mentioned above. By adopting such configuration, it is possible to obtain high accuracy easily because the processing of the high-frequency information which requires accuracy can be executed in one dimension only, and to achieve high-speed processing because greater filtering is possible in a smaller number of calculation steps.

Figure 24:
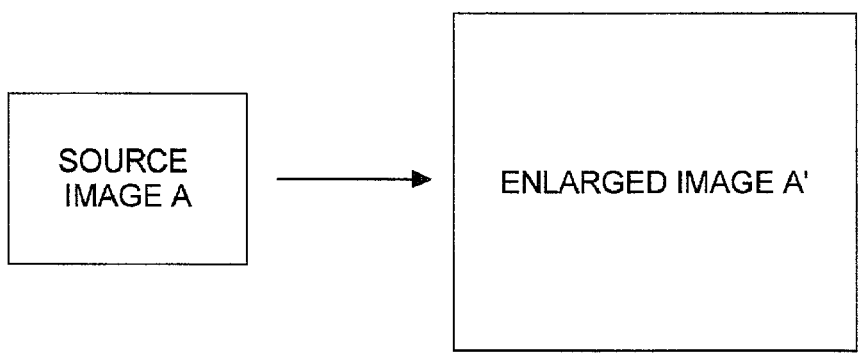
FIG. 24 is an explanatory diagram of yet another embodiment of spatial filtering.

FIG. 24 is an explanatory diagram of yet another embodiment of spatial filtering. Processing for obtaining after-enlarged image A' from source image A as shown in the figure, is described below. When "sharpness first" is specified from the processing type instruction means (for example, instruction information input section 7 in FIG. 7) of the image processing apparatus, source image A will be provided with spatial filtering (sharpness enhancement) and then the image will be enlarged by having its image size changed. When "granularity first" is specified from the processing type instruction means, after-enlarged image A' will be provided with spatial filtering (sharpness enhancement).

In the example of FIG. 2, the image size change in step S4 is positioned between steps S6 and S7 when the "sharpness first" process occurs.

As described above, according to this embodiment, when strong sharpness enhancement is required for spatial filtering, the order of image processing will be spatial processing first and then image size changing, and when weak sharpness enhancement is required for spatial filtering, the order of image processing will be image size changing first and then spatial processing.

In this way, by changing the spatial filtering target according to the particular priority level, sufficient enhancement can be easily implemented when strong sharpness is required, and smooth gradation can be reproduced with minimum noise when relatively weak sharpness is required.

According to the present invention, it is possible to realize the image processing apparatus that provide image processing described above. In this case, the section (equivalent to image processing section 8 in FIG. 8) that provides above-described image processing uses the CPU or other units included in the system. Image data that has undergone image processing can also be displayed at the image display section of the system, recorded on its information recording media, and printed onto its printer(s).

As is detailed in the above, according to the present invention, the following effects can be obtained:

(1) The strong noise appearing as white spots and/or black spots on the image when its sharpness is enhanced can be suppressed.

(2) The noise suppression effect corresponding to the characteristics of the filter and to the necessary image effect can be obtained.

(3) It is possible to enhance sharpness with suppressed noise and at the same time to suppress effectively the characteristic low-frequency noise of silver salt films and the chroma noise usually induced into digital images.

(4) In addition to the above characteristics, preferable reproduction of gradation images can be achieved.

(5) Moire-like noise and other defects can be reduced since the appropriate interpolation process is performed for each color component.

(6) Preferable image processing with higher accuracy is possible since an more precisely interpolation process can be performed on each color component that requires accuracy.

(7) It is possible to obtain stable processing characteristics for various scaling coefficients since, even when the scaling coefficient is adjusted precisely, spatial interpolation characteristics can also be set precisely.

(8) Both high-accuracy processing and high-speed processing can be implemented by performing a highly accurate interpolation process on brightness information and applying fast processing to color components.

(9) It is possible to reduce the disadvantages that when strong enlarge/reduce processing is provided, size reduction information will be missing, and that when the image is enlarged, the original shape of pixels will be visible or the image itself will lack smoothness.

(10) Strong image noise can be reduced with the edge of image information being left intact.

(11) Since differential information values greater than the threshold value will not undergo smoothing, it is possible to realize the noise filtering processes that enable edge information to be maintained more easily.

(12) Filtering that yields a greater reduction effect against noise can be achieved.

(13) It is possible to achieve a wide range of noise elimination with smaller threshold value B since strong noise components are suppressed beforehand by image processing described in Items (10) to (12) at the beginning of this document, and hereby to reduce noise effectively without damaging the details of the image.

(14) It is possible to achieve smooth and high-quality image processing because strong noise can be reduced and because weak image noise can be eliminated over a wide range and strongly.

(15) It is possible to obtain high image reproducibility over a wide range from highlighted portions to shadow portions since the noise processing level can be changed according to the amount of noise encountered during gradation conversion.

(16) It is possible to obtain accuracy easily and achieve high-speed processing, since high-frequency information that requires accuracy can undergo processing in one dimension only.

(17) It is possible to effectively adjust changes in the characteristics of each color component in, for example, an image reading unit or image writing unit, since low-frequency processing can be conducted for each color component.

(18) A high-quality high-speed image output service can be realized.

(19) It is possible to execute sufficient enhancement easily when high sharpness is required, and accomplish smooth gradation reproduction with less noise when relatively low sharpness is required.

(20) High-quality image processing that matches the particular requirements can be achieved.

As described above, according to the present invention, it is possible to supply the image processing methods and image processing apparatus that enable sharpness enhancing, image size changing, and image quality adjusting processes to be performed with minimum image noise and minimum image quality deterioration and at high processing speed.

Disclosed embodiment can be varied by a skilled person without departing from the spirit and scope of the invention.

What is claimed is:

1. An image-processing method for creating processed image data from source image data via an image-conversion processing including at least one spacial-filtering processing, said method comprising:

setting at least one predetermined upper-limit value for a variation amount indicating an amount of difference between said source image data and said processed image data; and then performing said image-conversion processing to convert said source image data into said processed image data by applying said at least one spatial-filtering processing to the source image data within a range of said variation amount limited by said predetermined upper-limit value.

2. The image-processing method of claim 1, wherein said at least one spatial-filtering processing comprises a plurality of different spatial-filtering processings, a predetermined upper-limit value for a variation amount is set for each of the plurality of spatial-filtering processings based on characteristics of the respective spatial-filtering processings, and the plurality of spatial-filtering processings are performed one of simultaneously in parallel and sequentially one by one.

3. The image-processing method of claim 2, wherein said plurality of spatial-filtering processings comprise a first spatial filter for emphasizing an amplitude of image data in a first spatial frequency band, and a second spatial filter for de-emphasizing an amplitude of image data in a second spatial frequency band;

wherein a first upper-limit value is set as the predetermined upper-limit value for the first spatial filter, and a second upper-limit value is set as the predetermined upper-limit value for the second spatial filter; and wherein said first spatial frequency band is higher than said second spatial frequency band, and said first upper-limit value is greater than said second upper-limit value.

4. The image-processing method of claim 2, wherein said plurality of spatial-filtering processings comprise a corresponding plurality of spatial filters and each of said plurality of spatial filters corresponds to a respective one of said plurality of spatial-filtering processings; and wherein each of said spatial-filtering processings is only applied to pixel data when an absolute value of a variation amount for the corresponding spatial-filtering processing is higher than a predetermined lower-limit value, said absolute value of the variation amount being derived by applying said spatial-filtering processing to each pixel data value corresponding to the spatial filter of said corresponding spatial-filtering processing.

5. An image-processing method for creating a variable sized image by applying one of an enlargement processing and a reduction processing to source image data including a plurality of color components, said method comprising:

applying a plurality of different spatial-interpolation processing methods to said source image data, said spatial-interpolation processing methods corresponding respectively to said plurality of color components;

wherein at least one of said spatial-interpolation processing methods for processing a corresponding one of the color components is performed in accordance with a magnification factor of said enlargement processing or reduction processing;

wherein said spatial-interpolation processing methods are performed by employing weighted-addition average values of a plurality of pixels, based on look-up tables of weighting coefficients corresponding to said plurality of spatial-interpolation processing methods; and wherein a new look-up table is created by performing a weighted averaging operation with said look-up tables in accordance with the magnification factor, and said at least one spatial-interpolation processing method that is performed in accordance with the magnification factor is performed by employing the new look-up table.

6. An image-processing method for creating processed image data by applying a spatial-filtering processing and one of an enlargement processing and a reduction processing to source image data, when a magnification factor of said one of the enlargement processing and the reduction processing is lower than a predetermined value, said method comprising:

performing (i) a first size-varying processing to vary a size of an image to a predetermined intermediate size, and (ii) a first angle-rotating processing to rotate said image by a predetermined first angle value;

applying said spatial-filtering processing to image data processed by said size-varying processing and said angle-rotating processing; and performing (i) second size-varying processing to further vary said size of said image to a predetermined objective size, and (ii) second angle-rotating processing to reversely rotate image by a second angle value, said second angle value being opposite said first angle value.

7. An image-processing method comprising:

extracting a plurality of couples of pixels, each of said couples of pixels comprising two pixels positioned symmetrically with respect to an objective pixel to be processed through an image-processing;

calculating differential values between said two pixels and said objective pixel for each of said plurality of couples of pixels;

extracting a specific couple of pixels having a minimum differential value out of said plurality of couples of pixels;

when said minimum differential value is lower than a predetermined first threshold value, setting a weighted-addition average value of said specific couple of pixels and said objective pixel, as a new value of the objective pixel;

establishing a new threshold value by adding a predetermined positive value to said minimum differential value;

extracting all of the couples of pixels having differential values lower than said new threshold value; and setting an average value of said extracted couples of pixels, as a value of the objective pixel.

8. An image-processing method for processing source image data, said method comprising:

setting a predetermined first threshold value and a maximum radius from a noticed pixel to an objective pixel in the source image data, said noticed pixel being a pixel to be processed by an image-processing, and said objective pixel being an object for comparison;

applying a signal-smoothening processing to said source image data based on the first threshold value and a differential value between said noticed pixel and said objective pixel to generate second source image data;

setting a second threshold value, which is smaller than said first threshold value, and an expanded radius, which is larger than said maximum radius; and applying said signal-smoothening processing to said second source image data based on the second threshold value and the expanded radius.

9. The image-processing method of claim 8, wherein said source image data is obtained by applying a gradation-converting processing to image data outputted by an image inputting apparatus, and at least one of said first threshold value and said second threshold value is determined based on gradation-conversion characteristics in the vicinity of a signal value of said noticed pixel.

10. An image-processing apparatus for processing an image, comprising:

an image-inputting section to acquire image data of a source image from an image recording medium or a document having said source image thereon;

an image-processing section to apply the image-processing method recited in claim 1 to said image data acquired by said image inputting section, so as to create processed image data; and an image-outputting section to output said image in at least one of: a first mode in which said processed image data is written onto an information-recording medium, a second mode in which said processed image is printed, and a third mode in which said processed image data is displayed on an image-displaying device.

11. An image-processing method for creating processed image data by applying a spatial-filtering processing and a size-converting processing in an enlarging direction to source image data, comprising the steps of:

determining whether an effect of a sharpness-emphasizing processing, to be performed in said spatial-filtering processing, should be relatively strong or weak, based on instructive information in regard to image-processing items inputted in advance; and applying said spatial-filtering processing at first, and then, said size-converting processing to said source image data, when determining that said effect of said sharpness-emphasizing processing should be relatively strong; or applying said size-converting processing at first, and then, said spatial-filtering processing to said source image data, when determining that said effect of said sharpness-emphasizing processing should be relatively weak.

12. An image-processing apparatus for processing an image, comprising:

an image-inputting section to acquire image data of a source image from an image recording medium or a document having said source image;

an instructive-information inputting section to input instructive information in regard to image-processing items to be performed in said image-processing apparatus;

image-processing section to apply an image-processing to said image data acquired by said image inputting section, so as to create processed image data; and an image-outputting section to output said image in either a first mode that said processed image data are written onto an information-recording medium, or a second mode that said image is written on an image recording medium to obtain a hardcopy, or a third mode that said image is displayed on an image-displaying device;

wherein said image-processing section determines whether an effect of a sharpness-emphasizing processing, to be performed in a spatial-filtering processing, should be relatively strong or weak, based on said instructive information in regard to said image-processing items inputted by said instructive-information inputting section; and wherein said image-processing section applies said spatial-filtering processing at first, and then, said size-converting processing to said image data, when determining that said effect of said sharpness-emphasizing processing should be relatively strong; or said image-processing section applies said size-converting processing at first, and then, said spatial-filtering processing to said image data, when determining that said effect of said sharpness-emphasizing processing should be relatively weak.

* * * * *